(12) United States Patent
Kawai

(10) Patent No.: US 9,342,081 B2
(45) Date of Patent: May 17, 2016

(54) AIR CONDITIONER

(75) Inventor: Tomofumi Kawai, Kawasaki (JP)

(73) Assignee: FUJITSU GENERAL LIMITED, Kanagawa (JP)

(*) Notice: Subject to any disclaimer, the term of this patent is extended or adjusted under 35 U.S.C. 154(b) by 383 days.

(21) Appl. No.: 13/980,867

(22) PCT Filed: Jan. 17, 2012

(86) PCT No.: PCT/JP2012/050840
§ 371 (c)(1),
(2), (4) Date: Jul. 19, 2013

(87) PCT Pub. No.: WO2012/099115
PCT Pub. Date: Jul. 26, 2012

(65) Prior Publication Data
US 2013/0297081 A1    Nov. 7, 2013

(30) Foreign Application Priority Data
Jan. 20, 2011    (JP) .................................. 2011-010302

(51) Int. Cl.
*G05D 23/19*    (2006.01)
*F24F 11/00*    (2006.01)
*G08C 17/02*    (2006.01)

(52) U.S. Cl.
CPC ............. *G05D 23/19* (2013.01); *F24F 11/006* (2013.01); *F24F 11/0086* (2013.01); *G08C 17/02* (2013.01); *F24F 2011/0068* (2013.01)

(58) Field of Classification Search
USPC ...................... 700/286, 276; 62/125; 702/183
See application file for complete search history.

(56) References Cited

U.S. PATENT DOCUMENTS 5,092,671 A * 3/1992 Van Os .................. H04N 9/317
348/E9.027
5,326,027 A * 7/1994 Sulfstede .............. F24F 1/0003
165/11.1

(Continued)

FOREIGN PATENT DOCUMENTS

| CN | 2352866 Y | 12/1999 |
|---|---|---|
| JP | 07-071806 | 3/1995 |

(Continued)

OTHER PUBLICATIONS

Office Action Chinese Patent Application No. 201280005605.9 dated Apr. 23, 2015.
International Search Report issued in Application No. PCT/JP2012/050840 dated Apr. 24, 2012.

*Primary Examiner* — Kidest Bahta
(74) *Attorney, Agent, or Firm* — McDermott Will & Emery LLP

(57) ABSTRACT

An air conditioner includes a remote controller that performs bidirectional communication using radio waves with an air-conditioner main body. The air-conditioner main body includes a main-body receiver that receives a control signal from the remote controller and a main-body transmitter that transmits operating information to the remote controller. The remote controller includes a remote-control transmitter that transmits a control signal to the main-body receiver, a remote-control receiver that receives the operating information from the main-body transmitter, a display unit that displays the operating information, a display controller that controls the display unit. The display controller displays, on the display unit, the operating information when the display controller receives the operating information from the main-body transmitter, and an indication of communication error when the display controller fails to receive the operating information, when communication between the remote controller and the air-conditioner main body is not established.

6 Claims, 26 Drawing Sheets

(56) References Cited

U.S. PATENT DOCUMENTS

| | | | | |
|---|---|---|---|---|
| 5,495,722 A * | 3/1996 | Manson | ............. | F24F 11/0009 236/51 |
| 2009/0026280 A1* | 1/2009 | Liao | ................... | F24F 11/0034 236/46 R |

FOREIGN PATENT DOCUMENTS

| | | |
|---|---|---|
| JP | 2007-278696 A | 10/2007 |
| JP | 2009-264604 A | 11/2009 |
| JP | 2010-164228 A | 7/2010 |

\* cited by examiner

FIG.5

| AIR-CONDITIONER MODEL INFORMATION | SERIES NAME: Z/S |
| --- | --- |
| | YEAR OF INDOOR UNIT MANUFACTURED: A TO Z |
| | CHARACTER STRING: (MODEL NAME, WITHIN 16 CHARACTERS) |
| | DERIVATIVE MODEL: 1 |
| | AIR CONDITIONER ID (MAC ADDRESS) |

FIG.6

| AIR-CONDITIONER MODEL INFORMATION | SERIES NAME: Z OR S |
| --- | --- |
| | YEAR OF INDOOR UNIT MANUFACTURED: A |
| | DERIVATIVE MODEL: 1 |

AIR CONDITIONER

RELATED APPLICATIONS

This application is the U.S. National Phase under 35 U.S.C. §371 of International Application No. PCT/JP2012/050840, filed on Jan. 17, 2012 which in turn claims the benefit of Japanese Application No. 2011-010302, filed on Jan. 20, 2011, the disclosures of which Applications are incorporated by reference herein.

FIELD

The present invention relates to an air conditioner that uses radio waves to perform bidirectional communication between a main body of the air conditioner and a remote controller that controls operation of the air-conditioner main body.

BACKGROUND

In recent years, there has been an air conditioner having an air-conditioner main body and a remote controller (hereinafter referred to as a remote control) each of which is provided with a bidirectional communication unit. The remote control performs operation control on the air-conditioner main body, and the air-conditioner main body transmits, to the remote control, data of power consumption or electricity charges from an operation start to an operation stop. The remote control receives the data and displays the data on a display unit of the remote control (see Patent Literature 1).

CITATION LIST

Patent Literature

Patent Literature 1: Japanese Patent Application Laid-open No. 2007-278696

SUMMARY

Technical Problem

Such a conventional air conditioner, however, has some drawbacks in performing bidirectional communication using radio waves in that, when the remote control is operated in the next room or the like in which the air conditioner that is a target of operation is not placed and the air conditioner is located within the reach of radio waves, the operational setting of the air conditioner may be changed without being noticed and it is not possible to check how the setting was changed.

Furthermore, it is conceivable with the conventional air conditioner that, when the remote control is accidentally operated in the next room or the like, the air-conditioner main body, which was in a shutdown state before the operation of the remote control, may start operating. As in the foregoing, the air conditioner with a bidirectional communication function using radio waves has drawbacks in that there is a possibility of an unintended operation control being performed by an erroneous or accidental operation of the remote control at all times and it is difficult to verify that.

An object of the present invention is to provide an air conditioner that makes the remote control display an operating status of the air-conditioner main body and a result of communication that is whether the wireless communication performed between the remote control and the air-conditioner main body is successful so that operating status the air-conditioner main body can be determined by just looking at the remote control.

Solution to Problem

It is an object of the present invention to at least partially solve the problems in the conventional technology. According to an aspect of the present invention, an air conditioner includes an air-conditioner main body, and a remote controller configured to perform bidirectional communication using radio waves to control operation of the air-conditioner main body. The air-conditioner main body includes a main-body receiver that receives a control signal to control operation from the remote controller, and a main-body transmitter that transmits operating information of the air-conditioner main body to the remote controller. The remote controller includes a remote-control transmitter that transmits a control signal of operation control to the air-conditioner main body, a remote-control receiver that receives the operating information transmitted from the air-conditioner main body, a display unit that displays control content of the operation control or the operating information, a display controller that controls display content of the display unit, and a reception-time limiting unit that sets the remote-control receiver in a reception standby state when the remote-control transmitter transmits the control signal and that cancels the reception standby state in a predetermined length of time, and the display controller displays the operating information on the display unit when the display controller has received the operating information from the main-body transmitted, and displays an error indication of communication being not available on the display unit, when the display controller has failed to receive the operating information, when communication between the remote controller and the air-conditioner main body is not established during the reception standby state.

According to further aspect of the present invention, the remote controller includes, in place of the reception-time limiting unit, a power-saving standby unit that sets the remote-control receiver in a reception standby state when a request signal that requests operating information is transmitted from the remote controller to the air-conditioner main body at a predetermined time interval, and that cancels the reception standby state in a predetermined length of time.

According to further aspect of the present invention, the display controller displays on the display unit, in place of the error indication, an indication of communication being successful when communication between the remote controller and the air-conditioner main body is successful during the reception standby state.

According to further aspect of the present invention, the display controller continues the display even when the remote controller is in the reception standby state.

According to still further aspect of the present invention, the display controller displays operating information at a point of time of transmitting the request signal when the operating information is not acquired.

According to still further aspect of the present invention, the display controller displays control content at a point of time of transmitting the request signal when the operating information is not acquired.

Advantageous Effects of Invention

In the air conditioner according to the present invention, when a remote-control transmitter of a remote controller transmits a control signal that controls operation of an air-conditioner main body and a main-body receiver of the air-conditioner main body receives the control signal, a main-body transmitter transmits operating information of the air-conditioner main body to the remote controller. When a remote-control receiver of the remote controller receives the operating information of the air-conditioner main body, a display controller controls display content and displays control content of operation control and the operating information on the remote controller. When the remote-control transmitter transmits the control signal, the remote-control receiver is set to a reception standby state, and then the reception standby state is cancelled by a reception-time limiting unit in a predetermined length of time. The display controller displays an error indication of the communication being not available on a display unit when the communication between the remote controller and the air-conditioner main body is not established during the reception standby state. As in the foregoing, the present invention makes the remote controller display the operating status of the air-conditioner main body and the result of communication that is whether the communication is successful, and thus has an effect that operating status the air-conditioner main body can be easily determined by just looking at the remote control.

BRIEF DESCRIPTION OF DRAWINGS

FIG. 5 is a table illustrating one example of model information of air conditioner receivable during the pairing setting in FIG. 4.

FIG. 6 is a table illustrating one example of the model information of air conditioner at least required for the pairing setting in FIG. 4.

DESCRIPTION OF EMBODIMENTS

An exemplary embodiment of an air conditioner according to the present invention will be described in detail based on the accompanying drawings hereinafter. The invention, however, is not intended to be restricted by the following embodiment.

Embodiment

Description of Configuration

Figure 1:
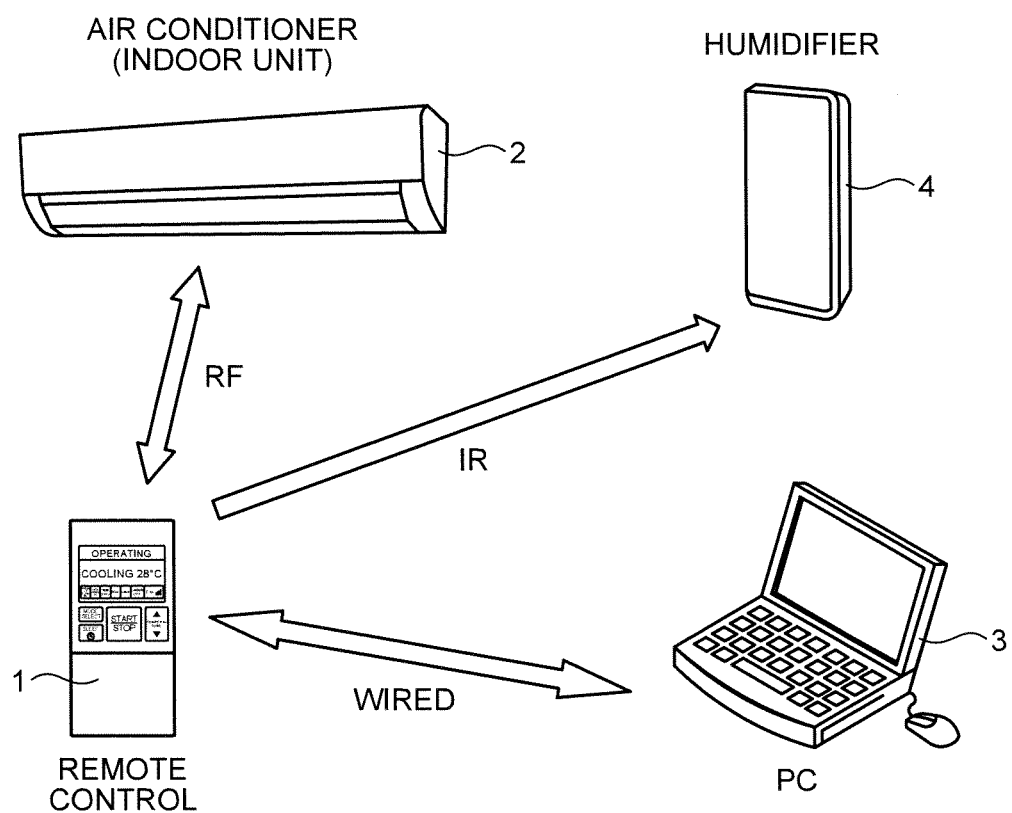
FIG. 1 is a diagram for explaining the relation of an air-conditioner main body, a remote control, a humidifier, and an externally connected device according to an embodiment of the invention.
Figure 2:
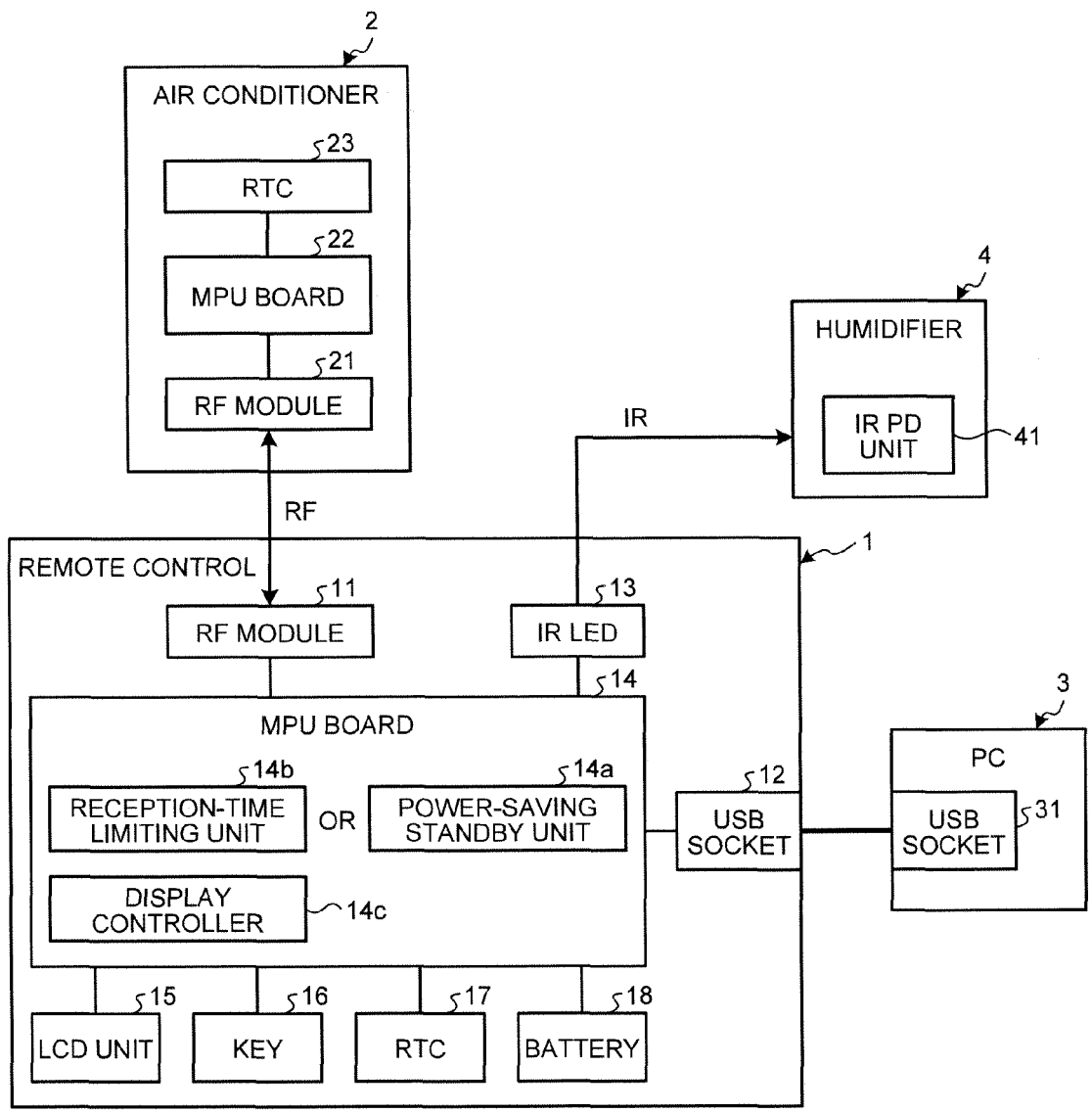
FIG. 2 is a block diagram schematically illustrating configurations of the air-conditioner main body, the remote control, the humidifier, and the externally connected device in FIG. 1.
Figure 3:
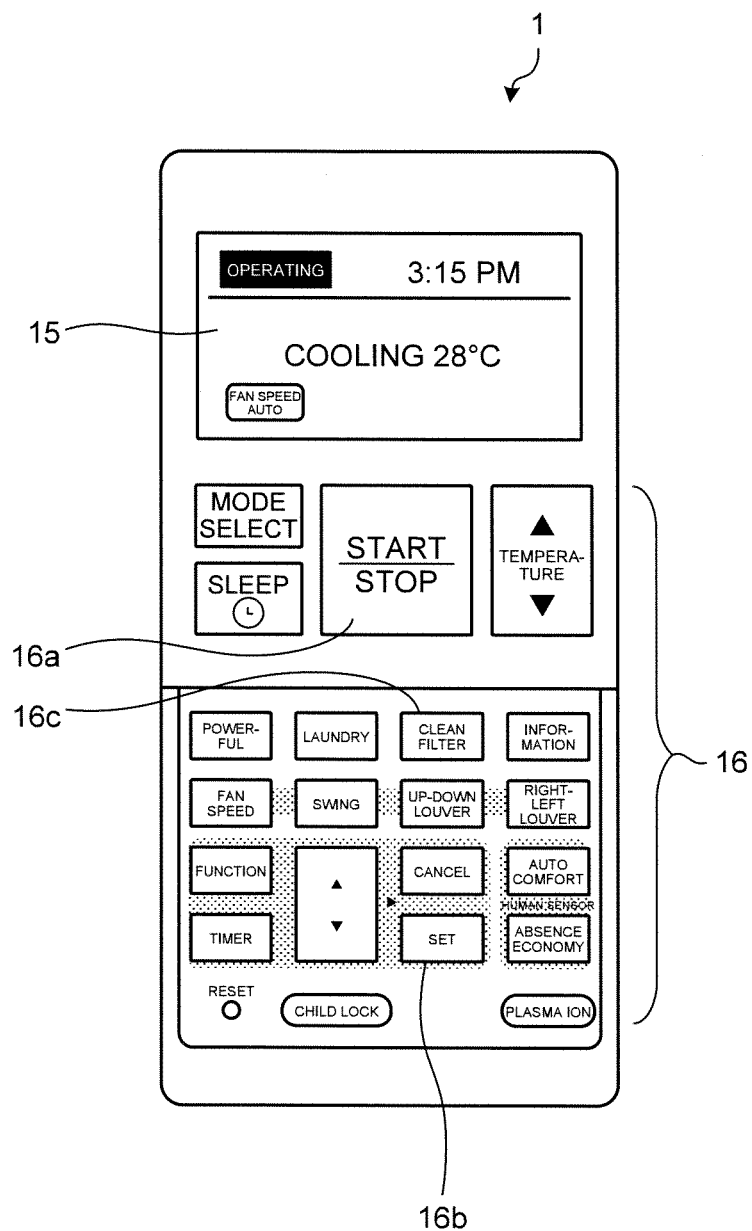
FIG. 3 is a plan view of the remote control for the air conditioner according to the embodiment.

FIG. 1 is a diagram for explaining the relation of an air-conditioner main body, a remote control, a humidifier, and an externally connected device according to an embodiment of the invention. FIG. 2 is a block diagram schematically illustrating the configurations of the air-conditioner main body, the remote control, the humidifier, and the externally connected device which are shown in FIG. 1. FIG. 3 is a plan view of the remote control for the air conditioner in the embodiment.

As illustrated in FIG. 1, the air conditioner in the embodiment is composed of an air-conditioner indoor unit 2 as an air-conditioner main body and a remote control 1, and remote-control operation and various settings are performed from the remote control 1 to the air-conditioner indoor unit 2 using bidirectional wireless communication by RF modules. When the remote control 1 acquires various types of operating information from the air-conditioner indoor unit 2, the information is displayed on a display unit of the remote control 1 and is used for operation management and various settings. Furthermore, the remote control 1 in the embodiment can be connected in a wired manner with a personal computer (PC) 3 via a USB connection terminal as an external connection terminal, and thus the operating-information management can be performed on the PC 3 side with the various types of operating information acquired. The remote control 1 in the embodiment is further capable of performing remote-control operation on target devices of operation, other than the air-conditioner indoor unit 2, such as a humidifier 4 using an infrared (IR) LED as an infrared transmitting unit.

The configurations of the remote control 1, the air-conditioner indoor unit 2 as an air-conditioner main body, the PC 3 connected via the USB connection terminal, and the humidifier 4 configured as in FIG. 1 will be schematically described with reference to FIG. 2. The remote control 1 includes an RF module 11 as a remote-control transmitter and as a remote-control receiver including a transceiver and an antenna to perform bidirectional wireless communication with the air-conditioner indoor unit 2, a USB socket 12 for USB connection with the personal computer (PC) 3 that performs information management and others, an IR LED 13 that transmits commands by an infrared (IR) diode to the humidifier 4 to be controlled, a memory to retain therein data such as various types of operating information received from the air-conditioner indoor unit 2 for a certain time period (for 40 days, here), and a microprocessor unit (MPU) board 14 mounted with an MPU that controls the respective units of the remote control 1. The MPU board 14 includes at least one of a reception-time limiting unit 14b as a reception-time limiting unit and a power-saving standby unit 14a as a power-saving standby unit. When a control signal is transmitted from the RF module 11 serving as a remote-control transmitter, the reception-time limiting unit 14b sets the RF module 11 serving as a remote-control receiver in a reception standby state and cancels the reception standby state in a predetermined length of time. When a request signal that requests operating information is transmitted from the remote control 1 to the air conditioner at a predetermined time interval, the power-saving standby unit 14a sets the RF module 11 serving as a remote-control receiver in a reception standby state and cancels the reception standby state in a predetermined length of time. The MPU board 14 further includes a display controller 14c that serves as a display control unit and controls display content of an LCD unit 15 serving as a display unit. The remote control 1 is further composed of the LCD unit 15 as a display unit that displays control information of the remote control 1 and operating information (operating hours, power consumption, and others) of the air-conditioner indoor unit 2, a key operating unit 16 to control a target device of operation, a real time clock (RTC) 17 of a dedicated timer that performs time management, a battery 18 that supplies power to the respective units of the remote control 1, and others.

The air-conditioner indoor unit 2 includes, as illustrated in FIG. 2, an RF module 21 as a main-body receiver and a main-body transmitter that performs bidirectional wireless communication with the RF module 11 of the remote control 1, and an MPU board 22 mounted with an MPU. The MPU controls the respective units of the air-conditioner indoor unit 2 based on the commands from the remote control 1 received by the RF module 21, collects operating information of the air-conditioner indoor unit 2, calculates operating hours and power consumption (electricity charges), and includes a memory that retains therein data for a predetermined period of time (for 10 days, here). The air-conditioner indoor unit 2 further includes an RTC 23 of a dedicated timer that performs time management.

The PC 3 includes, as illustrated in FIG. 2, a USB socket 31 to connect a USB cable to the USB socket 12 of the remote control 1. By installing operating-information management software, the PC 3 is allowed to transmit and receive data when the USB connection is established and to periodically collect operating information from the air-conditioner indoor unit 2 via the remote control 1 so that operation management can be continuously performed on a PC screen.

The humidifier 4 includes, as illustrated in FIG. 2, an IR PD (infrared receiving) unit 41 that receives an infrared signal transmitted from the IR LED 13 of the remote control 1. The remote control 1 can control the humidifier 4 by the infrared signal (commands).

The remote control 1 that controls operation of the air conditioner includes, as illustrated in FIG. 3, the LCD unit 15 composed of a liquid crystal display unit that displays operating information (details of operation, operating hours, power consumption, orientation of louvers, and others) and control information (success in communication, error in communication, and others), and the key operating unit 16 to control operation of the air-conditioner indoor unit 2. In the key operating unit 16, other than a start/stop key 16a that controls the air-conditioner indoor unit 2 to start and stop operating, a set key 16b that is necessary for the start of pairing, a clean filter key 16c for cleaning a filter, and others are provided.

The air conditioner in the embodiment is composed of the remote control 1 and the air-conditioner indoor unit 2. However, it is difficult to distinguish the target device of operation when an air conditioner of another model is located nearby because bidirectional wireless communication is performed using the RF modules. Consequently, it is necessary to perform pairing setting in advance.

Pairing Setting

Figure 4:
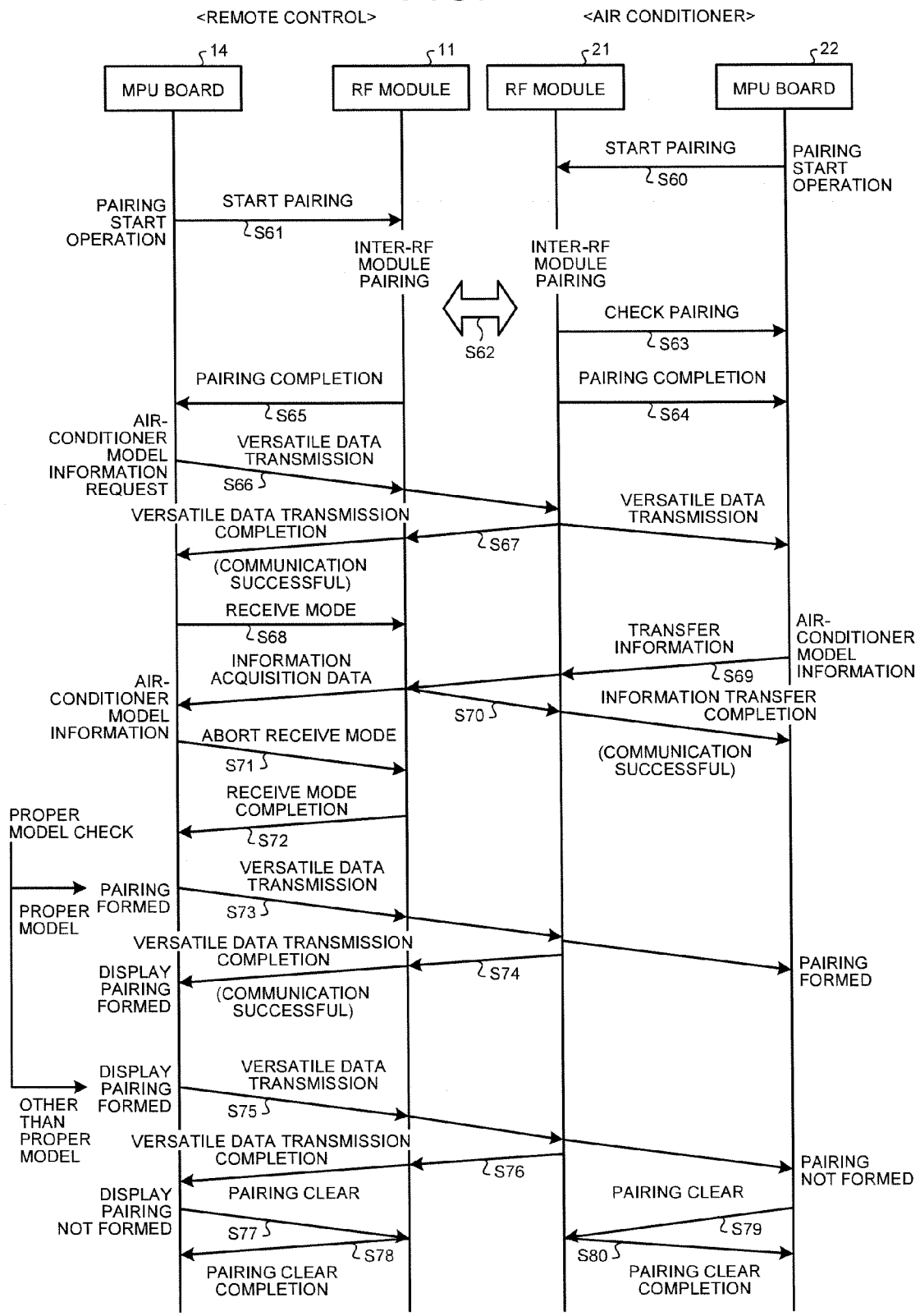
FIG. 4 is a diagram for explaining a procedure of pairing setting operation performed between the remote control and the air conditioner according to the embodiment.

FIG. 4 is a diagram for explaining a procedure of pairing setting operation performed between the remote control and the air conditioner in the embodiment. FIG. 5 is a table illustrating one example of model information of air conditioner receivable during the pairing setting in FIG. 4. FIG. 6 is a table illustrating one example of the model information of air conditioner at least required for the pairing setting in FIG. 4.

When registration setting of the remote control 1 is selected or when the other of pairing is not stored in a non-volatile memory (hereinafter referred to as an EEPROM)(not shown in the drawings) mounted on the MPU board 14 of the remote control 1 (when "no registration" is displayed on the LCD unit 15), the remote control 1 first turns into a remote-control registration setting mode and displays a pairing display in which a procedure used when performing the pairing with the air-conditioner indoor unit 2 is displayed. Likewise, when there is no pairing on the air-conditioner indoor unit 2, this condition is indicated by a lamp (not shown in the drawings) provided on the air-conditioner indoor unit 2. The pairing is started, as illustrated in FIG. 4, when an operator presses a pairing button (not shown in the drawings) provided on the air-conditioner indoor unit 2, whereby the execution state of pairing is indicated by sounding a buzzer and by lighting the lamp, and a pairing request signal is sent from the air-conditioner indoor unit 2 side to the RF module 21 (Step S60).

Furthermore, when the start/stop key 16a and the set key 16b, both of which are included in the key operating unit 16 of the remote control 1 where the set key 16b is exposed when an operation flap (not shown in FIG. 3) is open as depicted in FIG. 3, are simultaneously pressed while the pairing display is displayed on the LCD unit 15 of the remote control 1, a pairing request signal is sent to the RF module 11 and the pairing is started (Step S61). The LCD unit 15 of the remote control 1 displays an indication of "Registering the pairing". The communication for the pairing is performed between the RF modules 11 and 21 (Step S62). After checking whether the RF modules 11 and 21 are models with which performing pairing registration is possible (Step S63), the RF module 21 sends a pairing-completion signal indicating that the pairing of the RF modules is completed to the MPU board 22 (Step S64), and the RF module 11 sends the pairing-completion signal indicating that the pairing of the RF modules is completed to the MPU board 14 (Step S65).

The remote control 1 then transmits an air-conditioner model-information request as versatile data to the air-conditioner indoor unit 2 (Step S66). At this time, the signals of air-conditioner model-information receivable from the air-conditioner indoor unit 2 include, as illustrated in FIG. 5, series name (Z/S), year of indoor unit manufactured (A to Z), string of characters (model name, within 16 characters), derivative model (1), and an air conditioner ID (Media Access Control address or MAC address). When the air-conditioner indoor unit 2 receives the air-conditioner model-information request, the RF module 21 in the air-conditioner indoor unit 2 transmits a versatile-data transmission completion signal to the remote control 1 to notify that the transmission was successful (Step S67). The MPU board 14 of the remote control 1 switches the RF module 11 into receive mode (Step S68).

The MPU board 22 of the air-conditioner indoor unit 2 then transfers the model information of the air conditioner to the remote control 1 (Step S69). When the remote control 1 receives the model information of the air-conditioner indoor unit 2, the RF module 11 transmits an information-transfer completion signal to the air-conditioner indoor unit 2 to notify that the transmission was successful (Step S70).

When the remote control 1 acquires the air-conditioner model information, the remote control 1 notifies the RF module 11 of aborting the receive mode (Step S71), and then receives the completion of receive mode (Step S72).

The MPU board 14 of the remote control 1 determines whether the air-conditioner indoor unit 2 to set paring is a proper model for the paring based on the air-conditioner model information acquired. When the air-conditioner indoor unit 2 is the proper model and the signals received include at least the signals indicated in FIG. 6, the MPU board 14 of the remote control 1 transmits versatile data of pairing being formed to the air-conditioner indoor unit 2 (Step S73). Upon receiving the versatile data of pairing being formed, the RF module 21 of the air-conditioner indoor unit 2 notifies the remote control 1 that the transmission of versatile data is completed (communication successful) (Step S74). The MPU board 14 of the remote control 1 displays an indication that the pairing is formed on the LCD unit 15 for 5.5 seconds, and when the operator selects Z or S in accordance with the series name, the detail of the model selected is written to the EEPROM.

In contrast, when the air-conditioner indoor unit 2 to set pairing is determined to be not the proper model or when the air-conditioner model information received is other than the signals indicated in FIG. 6, the MPU board 14 of the remote control 1 transmits versatile data of pairing failure to the air-conditioner indoor unit 2 (Step S75). Upon receiving the versatile data of pairing failure, the RF module 21 of the air-conditioner indoor unit 2 notifies the remote control 1 that the transmission of versatile data is completed (Step S76). The MPU board 14 of the remote control 1 displays failure of pairing on the LCD unit 15 for 5.5 seconds and performs a process of clearing the paring (hereinafter, pairing clear) (Step S77), and then receives a notice of pairing clear being completed (Step S78).

When the pairing fails, the MPU board 22 in the air-conditioner indoor unit 2 also performs a process of pairing clear (Step S79), and then receives a notice of pairing clear being completed (Step S80). This completes the pairing setting.

Between the remote control 1 and the air-conditioner indoor unit 2 for which the above-described pairing setting is completed, the remote control 1 not only performs the operation control and various settings on the air-conditioner indoor unit 2 from the remote control 1, but also can acquire, by requesting, operating status logs (history) stored in the air-conditioner indoor unit 2 in accordance with the following communication sequence.

Communication Sequence between Air Conditioner and Remote Control

Figure 7:
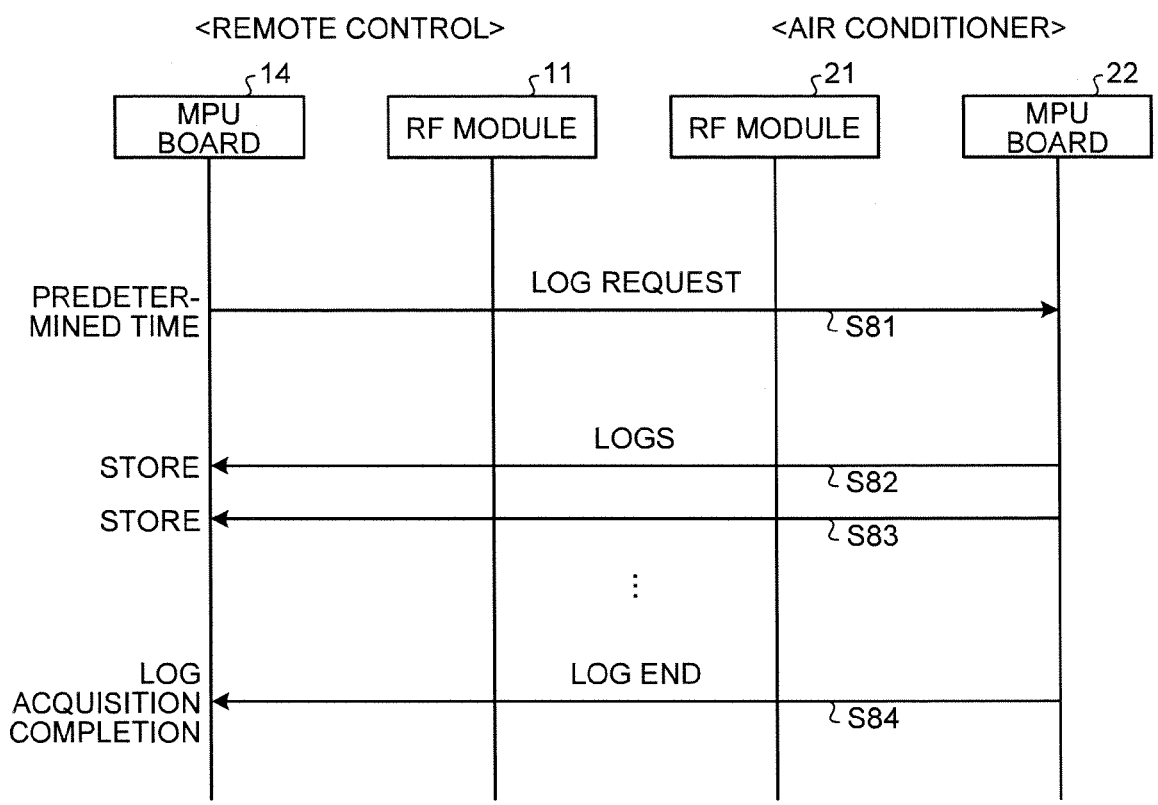
FIG. 7 is a diagram for explaining a communication procedure when log information is exchanged between the remote control and the air conditioner after the pairing is set in the embodiment.

FIG. 7 is a diagram for explaining a communication procedure when log information is exchanged between the remote control and the air conditioner after the pairing according to the embodiment is set. On the remote control 1, the operation to request and to collect operating status logs from the air-conditioner indoor unit 2 is performed at a predetermined time every day.

The MPU board 14 of the remote control 1 first transmits, as illustrated in FIG. 7, a log request to the MPU board 22 of the air-conditioner indoor unit 2 via the RF modules 11 and 21 when it comes to the predetermined time (for example, 0:03 AM in this case) by the RTC 17 (Step S81). The remote control 1 waits, after transmitting the log request, for the log data to be transmitted from the air-conditioner indoor unit 2. When the logs are not transmitted even after an elapse of a predetermined length of time while waiting for the logs, the remote control 1 regards this situation as a receive error due to receive time-out, and ends the waiting for the logs to end the log collection of the day. An EEPROM on the MPU board 22 of the air-conditioner indoor unit 2 has a capacity to store therein the air-conditioner operating status logs for the maximum of 10 days, and thus even when a receive error occurs, the logs are transferred collectively when receiving of logs is available the next time.

When the log data is transmitted from the air-conditioner indoor unit 2 in sequence (Steps S82, S83, . . . ) as illustrated in FIG. 7, the log data is stored in the EEPROM of the MPU board 14 of the remote control 1 each time. As for the way to store the log, when there is an unused area in the EEPROM, the log is written to the unused area, and when there is no unused area available, the log is stored by overwriting the writing area of the oldest log. Upon receiving a log end that indicates the end of log data from the air-conditioner indoor unit 2 (Step S84), the remote control 1 completes the log acquisition.

Furthermore, between the remote control 1 and the air-conditioner indoor unit 2, the operating status logs can be acquired from the air-conditioner indoor unit 2 and displayed on the LCD unit 15 of the remote control 1, when the remote control 1 transmits a command of operation control at a time other than the above-described predetermined time.

Examples of Display on Remote Control and Description of Operation

Figure 8:
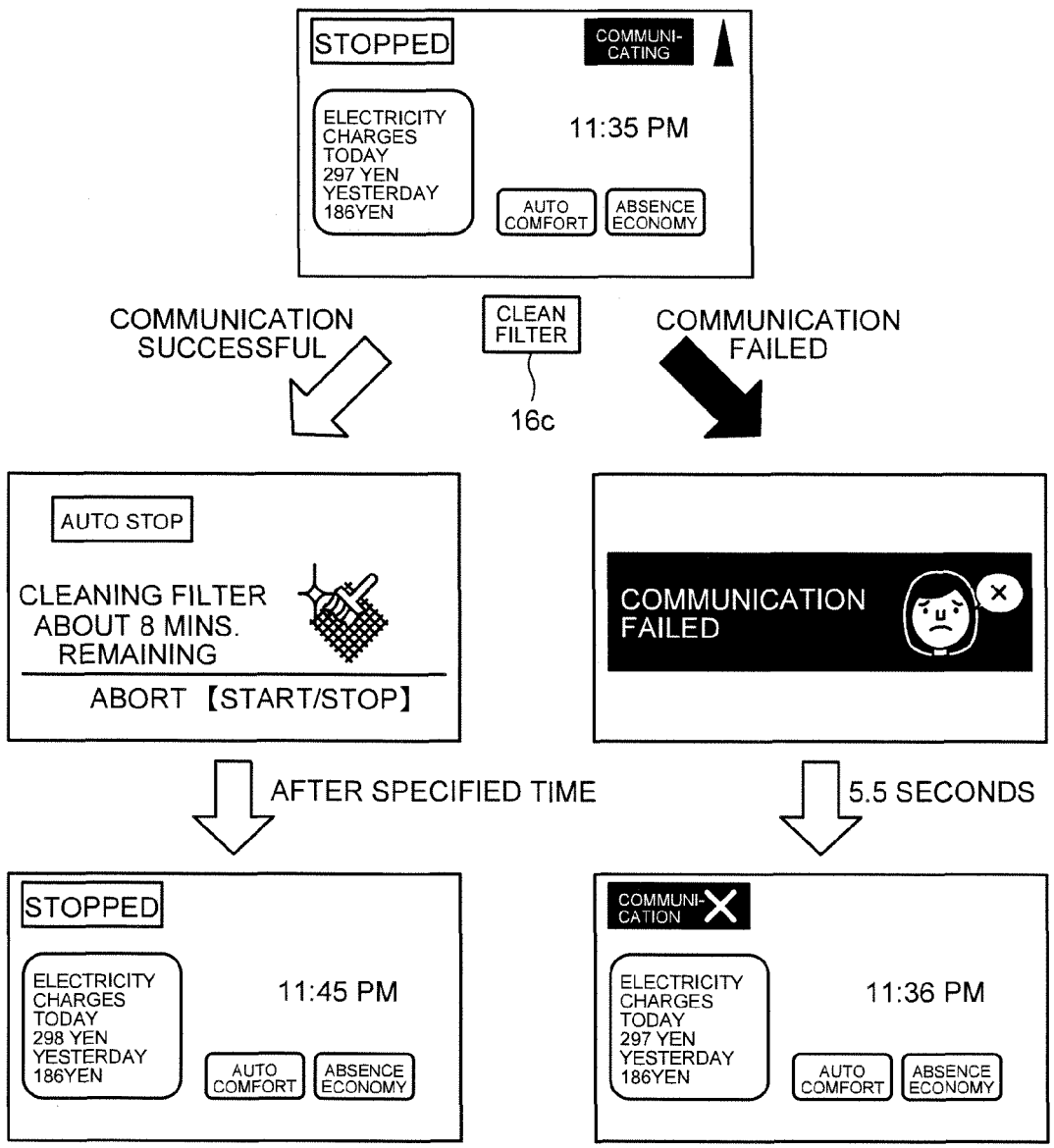
FIG. 8 is a diagram illustrating display examples of the remote control when operation control is performed on the air-conditioner main body in shutdown.
Figure 9:
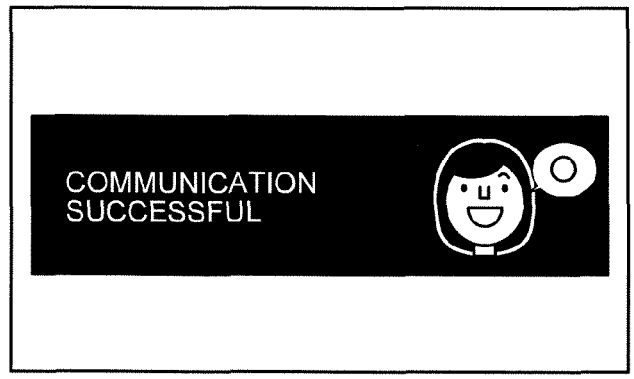
FIG. 9 is a diagram illustrating a screen displayed when the communication is successful out of the display examples of the remote control in FIG. 8.
Figure 10:
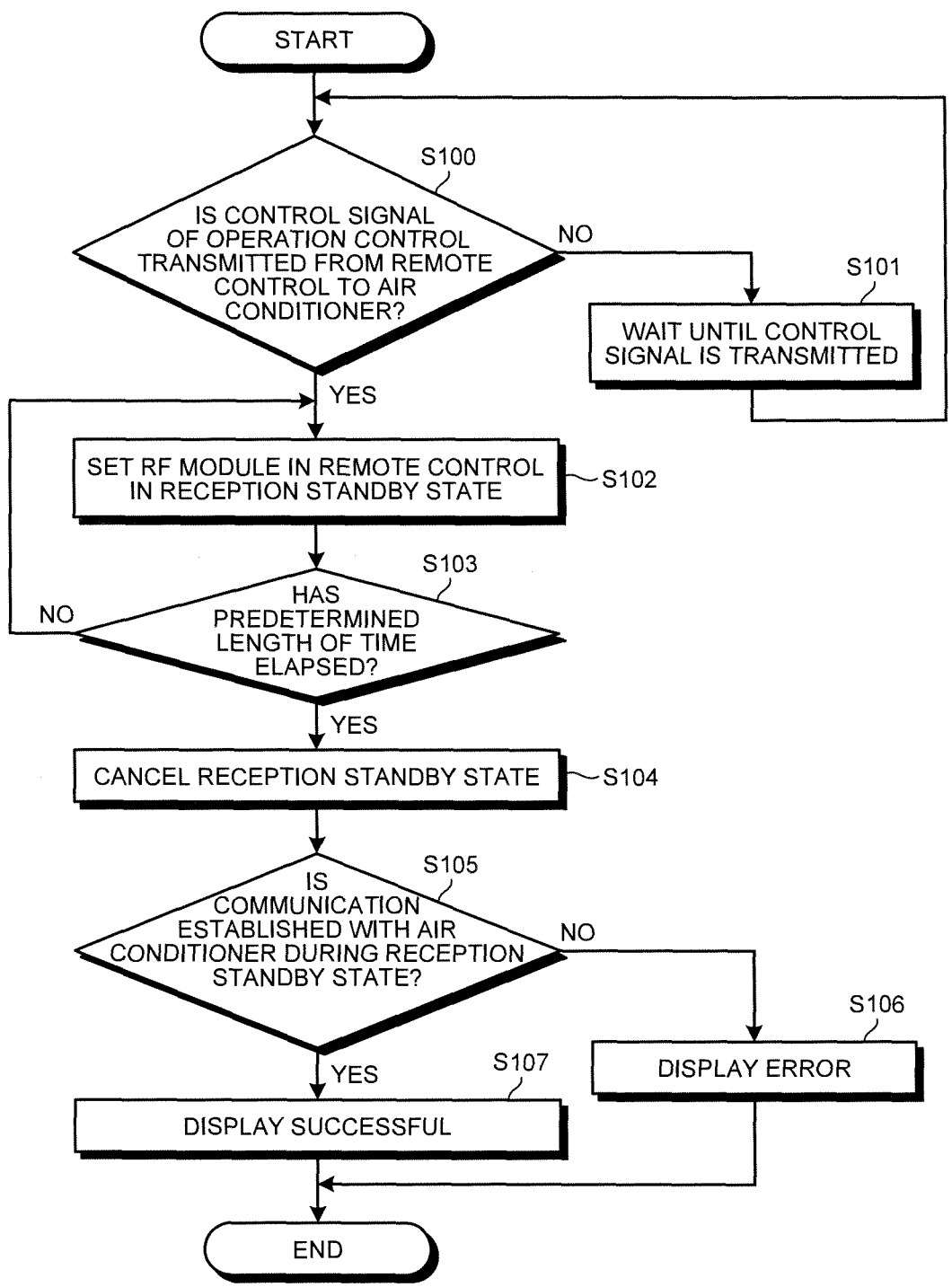
FIG. 10 is a flowchart for explaining the operation performed when a control signal of operation control is transmitted from the remote control to the air conditioner.
Figure 11:
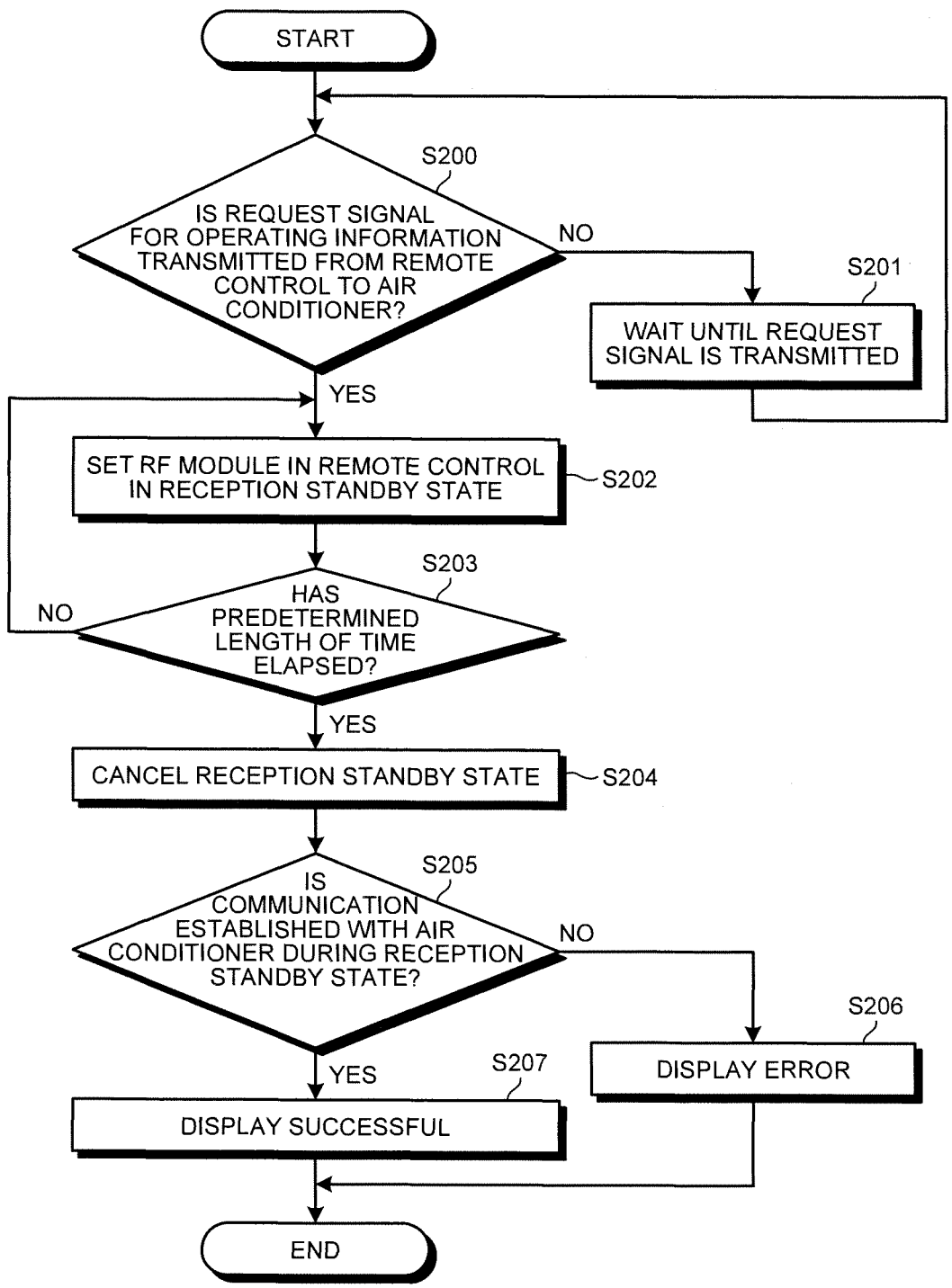
FIG. 11 is a flowchart for explaining the operation performed when a request signal for operating information is transmitted from the remote control to the air conditioner.

FIG. 8 is a diagram illustrating examples of display (hereinafter, display examples) on the remote control when operation control is performed on the air-conditioner main body in shutdown. FIG. 9 is a diagram illustrating a screen displayed when the communication is successful in addition to the display examples of the remote control in FIG. 8. FIG. 10 is a flowchart for explaining the operation performed when a control signal of operation control is transmitted from the remote control to the air conditioner. FIG. 11 is a flowchart for explaining the operation performed when a request signal for operating information is transmitted from the remote control to the air conditioner.

The display examples illustrated in FIG. 8, shows a case where the operator presses the clean filter key 16c of the remote control 1 while the air-conditioner indoor unit 2 is in shutdown, and a control signal to perform filter cleaning is transmitted to the air-conditioner indoor unit 2. By pressing down the clean filter key 16c, an indication of "communicating" is displayed at the upper right corner of the screen.

When the communication between the remote control 1 and the air-conditioner indoor unit 2 is successful, as indicated by a white arrow, the display of the remote control 1 changes to an operating information screen indicating that the filter cleaning is performed. The processing time of the filter cleaning is set for 10 minutes, and thus the remaining time can be displayed by the minute in countdown by the display controller 14c of the MPU board 14 and the RTC 17. Consequently, the operator can understand the detail of currently performed maintenance operation and the remaining operating time thereof, and thus the operator can wait at ease until the process is finished. When the specified time (for 10 minutes) of filter cleaning operation ends, the screen showing that the air-conditioner indoor unit 2 is in shutdown is displayed. The processing time may be a predetermined period of time, or may be determined and set to the remote control 1 each time in accordance with a using situation of the air-conditioner indoor unit 2.

The initial display screen of the remote control 1 in FIG. 8 shows a state where communication between the remote control 1 and the air-conditioner indoor unit 2 is being performed. However, when the communication fails, as indicated by a black arrow, the display screen changes to a screen, which is different from the initial screen, where a message "Communication failed" with an illustration is displayed. Consequently, the operator can understand that the communication with the air-conditioner indoor unit 2 failed. Then, after an elapse of 5.5 seconds, as indicated by a white arrow, a screen indicating that the air-conditioner indoor unit 2 is in shutdown (hereinafter, shutdown screen) with an indication of "Communication x" is displayed consecutively. As a result, the operator can understand that the filter cleaning operation which was previously instructed has not been performed by just looking at the shutdown screen even when the operator fails to see the screen with the massage "Communication failed" and the illustration. The operator can appropriately determine whether the operator should retry the filter cleaning by pressing the clean filter key 16c again at a position of where better communication situation is available, or the operator should prioritize a normal operation when the operator has no time to retry.

Furthermore, if unexpected one of the screen displays of the remote control 1 shown in FIG. 8, which is against the operator's intention, is displayed, the operator can determine that it is due to an erroneous operation of the remote control 1. Supposing that an unintended operation is started, a command to stop the operation based on the display content of the remote control 1 needs to be transmitted.

In the screen examples shown in FIG. 8, a communication error is displayed when the communication fails. However, it is possible to display the screen illustrated in FIG. 9 only when the communication is successful. The liquid crystal display panel used in the air conditioner in the present embodiment is of a memory type liquid crystal display in which the content displayed on the screen is retained even when the power is turned off. This allows the power consumption of the remote control 1 to be further reduced. In the embodiment, the display device of the remote control 1 uses a liquid crystal display. However, the display device may be implemented using a flat panel display such as an EL.

In the shutdown screen of the air-conditioner indoor unit 2 illustrated in FIG. 8, today's electricity charges and yesterday's electrical charges are displayed in an electricity charge display region. At a predetermined time (for example, 0:03 AM) each day, today's electricity charges are displayed as yesterday's electricity charges and today's electricity charges are reset. However, when a read error occurs in the process at the predetermined time, a screen on which no electricity charges are displayed is generated. Such a trouble of missing items which should be displayed is reduced by rewriting yesterday's electricity charges data with today's electricity charges displayed on the remote control, not by reading in all of the display data for the remote control 1 from the air-conditioner indoor unit 2, even when a communication error occurs. While it has been discussed as the displaying of electricity charges here, it is not restricted to this, and the same may be used for the operating hours of the air-conditioner indoor unit 2, outside air temperature, average temperature while the air-conditioner indoor unit 2 is in operation, and others.

Next, a case is explained where a communication error occurs when the communication is performed while the air conditioner is in operation. The LCD unit 15 in FIG. 3 indicates the display content in operation, and thus "Cooling" as operating mode and "28° C." as setting content are displayed. FIG. 8 illustrates the display content while the air conditioner is in shutdown in which the operating mode or setting content is not displayed, but the current time in larger letters than that in operation, the electricity charges used, and others are displayed. When an instruction of filter cleaning is given and a communication error occurs while a display of "in operation" is indicated, the screen with the massage "Communication failed" and an illustration is displayed. Then, "Communication x" is displayed while retaining the display of the operating mode or the setting content. Even though "Communication x" is displayed, the operator can understand that the operation of the air-conditioner indoor unit 2 is continued because the display of the operating mode or the setting content is retained. This is may be applied not only to when the communication concerning the instruction of filter cleaning failed during operation, but also to when other communication fails. For example, when the communication failed in exchanging log information, "Communication x" is indicated while retaining the display of the operating mode or the setting content, which enables the operator to understand that the operation of the air-conditioner indoor unit 2 is continued even though a communication error occurred.

The flowchart in FIG. 10 illustrates the operation performed when the remote control 1 of the air conditioner in the embodiment transmits a control signal of operation control to the air-conditioner indoor unit 2.

The remote control 1 first determines whether a control signal is transmitted from the remote control 1 to the air-conditioner indoor unit 2 (Step S100), and waits until a control signal is transmitted from the remote control 1 (Step S101).

When the remote control 1 transmits the control signal to the air-conditioner indoor unit 2 (Yes at Step S100), the RF module 11 in the remote control 1 is set in a reception standby state (Step S102). This reception standby state is not continued, but is held only for a predetermined length of time by the reception-time limiting unit 14b of the MPU board 14 (Step S103). This allows the power consumption of the remote control 1 while in reception standby to be effectively reduced and the bidirectional communication to be performed using the time of transmitting the control signal.

The reception-time limiting unit 14b measures the elapse of time using the RTC 17, and when a predetermined length of time elapses (Yes at Step S103), cancels the reception standby state (Step S104). The MPU board 14 further determines whether the communication is established with the air-conditioner indoor unit 2 during the above-described reception standby state, and when the communication is not established (No at Step S105), an error indication is displayed (Step S106). Meanwhile, when the communication is established, a successful indication as illustrated in FIG. 9 can be displayed (Step S107).

The flowchart in FIG. 11 illustrates the operation performed when the remote control 1 transmits a request signal for operating information to the air-conditioner indoor unit 2. The remote control 1 first determines whether a request signal is transmitted from the remote control 1 to the air-conditioner indoor unit 2 (Step S200), and waits until a request signal is transmitted from the remote control 1 (Step S201).

When the request signal is transmitted from the remote control 1 to the air-conditioner indoor unit 2 (Yes at Step S200), the RF module 11 in the remote control 1 is set in a reception standby state (Step S202). This reception standby state is not continued, but is held only for a predetermined length of time by the power-saving standby unit 14a of the MPU board 14 (Step S203). This allows the power consumption of the remote control 1 while in reception standby to be effectively reduced and the bidirectional communication to be performed using the time of transmitting the request signal. Since the request signal can be transmitted periodically, different from the control signal in FIG. 10, the bidirectional communication can be performed in intervals which the remote control 1 requires.

The power-saving standby unit 14a measures the elapse of time using the RTC 17, and when a predetermined length of time elapses (Yes at Step S203), cancels the reception standby state (Step S204). The MPU board 14 further determines whether the communication is established with the air-conditioner indoor unit 2 during the above-described reception standby state, and when the communication is not established (No at Step S205), an error indication is displayed (Step S206). Meanwhile, when the communication is established, a successful indication as illustrated in FIG. 9 can be displayed (Step S207).

Communication Sequence between Remote Control and PC

The remote control 1 in the embodiment further includes the USB socket 12 as an external connection terminal to connect with the PC 3 that can manage the operating information of the air-conditioner indoor unit 2. Consequently, connecting the remote control 1 with the PC 3 in USB connection allows the PC 3 to collect the operating information of the air-conditioner indoor unit 2 via the remote control 1, whereby the PC 3 is able to continuously manage the operating information of the air-conditioner indoor unit 2.

Figure 12:
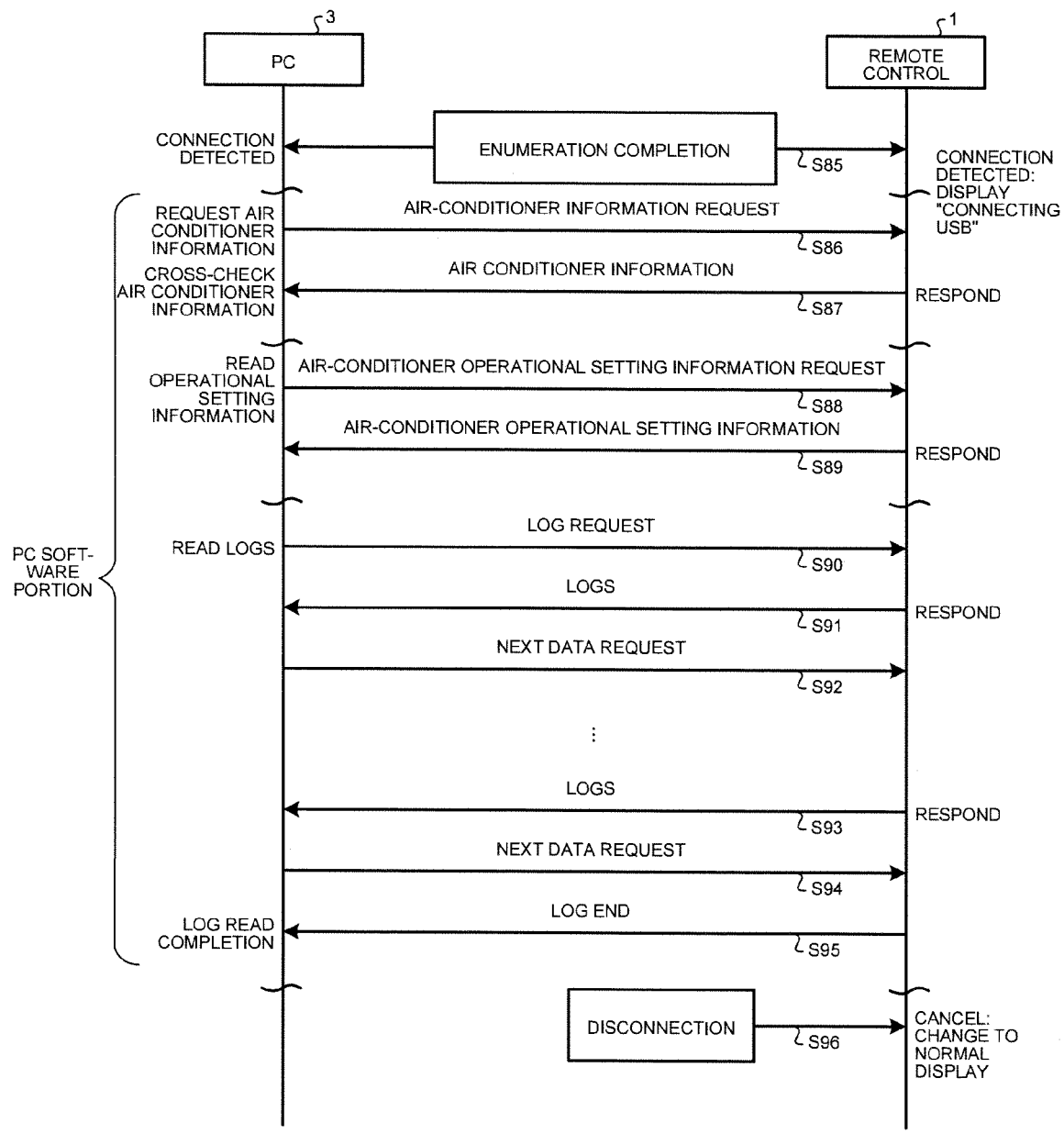
FIG. 12 is a diagram for explaining a communication procedure when log information is exchanged between the remote control and a PC in the embodiment.

FIG. 12 is a diagram for explaining a communication procedure when log information is exchanged between the remote control and the PC in the embodiment. This is to transmit to the PC 3 the logs of operating status of the air conditioner stored in the EEPROM of the MPU board 14 in the remote control 1 by the above-described communication sequence performed between the air-conditioner indoor unit 2 and the remote control 1. The EEPROM of the MPU board 14 in the remote control 1 has a capacity to store therein the logs received from the air conditioner for the maximum of 40 days.

When the USB connection is made between the remote control 1 and the PC 3, a series of processes until the communication is available (enumeration) is performed first by a USB driver, and the completion of enumeration allows the communication to be performed between the remote control 1 and the PC 3 (Step S85). During the enumeration, the indication of "Connection detected: USB connecting" is displayed on the LCD unit 15 of the remote control 1.

When the enumeration is completed, the PC 3 requests air-conditioner information from the remote control 1 (Step S86). The remote control 1 responds to this and transmits the air-conditioner information stored in the EEPROM of the MPU board 14 to the PC 3 (Step S87). The air-conditioner information includes, for example, an air-conditioner MAC address, room information, and a remote-control type, in addition to the product name, series name, power band, manufactured year of indoor unit, and working voltage of the air conditioner.

The PC 3 cross-checks the air-conditioner information received with the air-conditioner information in management, and identifies which air conditioner the air-conditioner information received corresponds to. When the PC 3 manages a plurality of air conditioners, it is necessary to cross-check which air conditioner the air-conditioner information received corresponds to.

The PC 3 subsequently requests air-conditioner operational-setting information from the remote control 1 to read in the operational-setting information (Step S88). The remote control 1 responds to this and transmits the air-conditioner operational-setting information stored in the EEPROM of the MPU board 14 to the PC 3 (Step S89). The air-conditioner operational-setting information includes, for example, a sound level, use of voice announcement, switching of absence economy, use of internal cleaning, maintenance time, use of energy-saving fan, use of automatic powerful operation, and current switching.

The PC 3 then makes a log request to the remote control 1 so as to read in logs (Step S90). The remote control 1 responds to the log request from the PC 3 and transmits log data (Step S91). Between the PC 3 and the remote control 1, a request for next data and transmission of log data are repeated (Steps S92, S93, S94). The remote control 1 transmits a log end to the PC 3 at the time there is no more log data to transmit (Step S95), and this completes the log read-in process in the PC 3. Subsequently, when the USE connection connecting the PC 3 and the remote control 1 is disconnected (Step S96) and the remote control 1 is cancelled from the communication mode with the PC 3, the display on the LCD unit 15 is changed to the normal display.

As in the foregoing, the operating logs of the air conditioner temporarily stored (capable of storing for the maximum of 10 days) in the air-conditioner indoor unit 2 are transmitted to the remote control 1 and stored therein (capable of storing for the maximum of 40 days), and at the time the remote control 1 and the PC 3 are connected in USB connection, the logs stored in the remote control 1 are transferred to the PC 3 side. The PC 3 is allowed to manage, using operating-information management software installed in advance, the operating information of the air-conditioner indoor unit 2 as illustrated in FIGS. 18 to 33.

Management of Operating Information in PC

Figure 13:
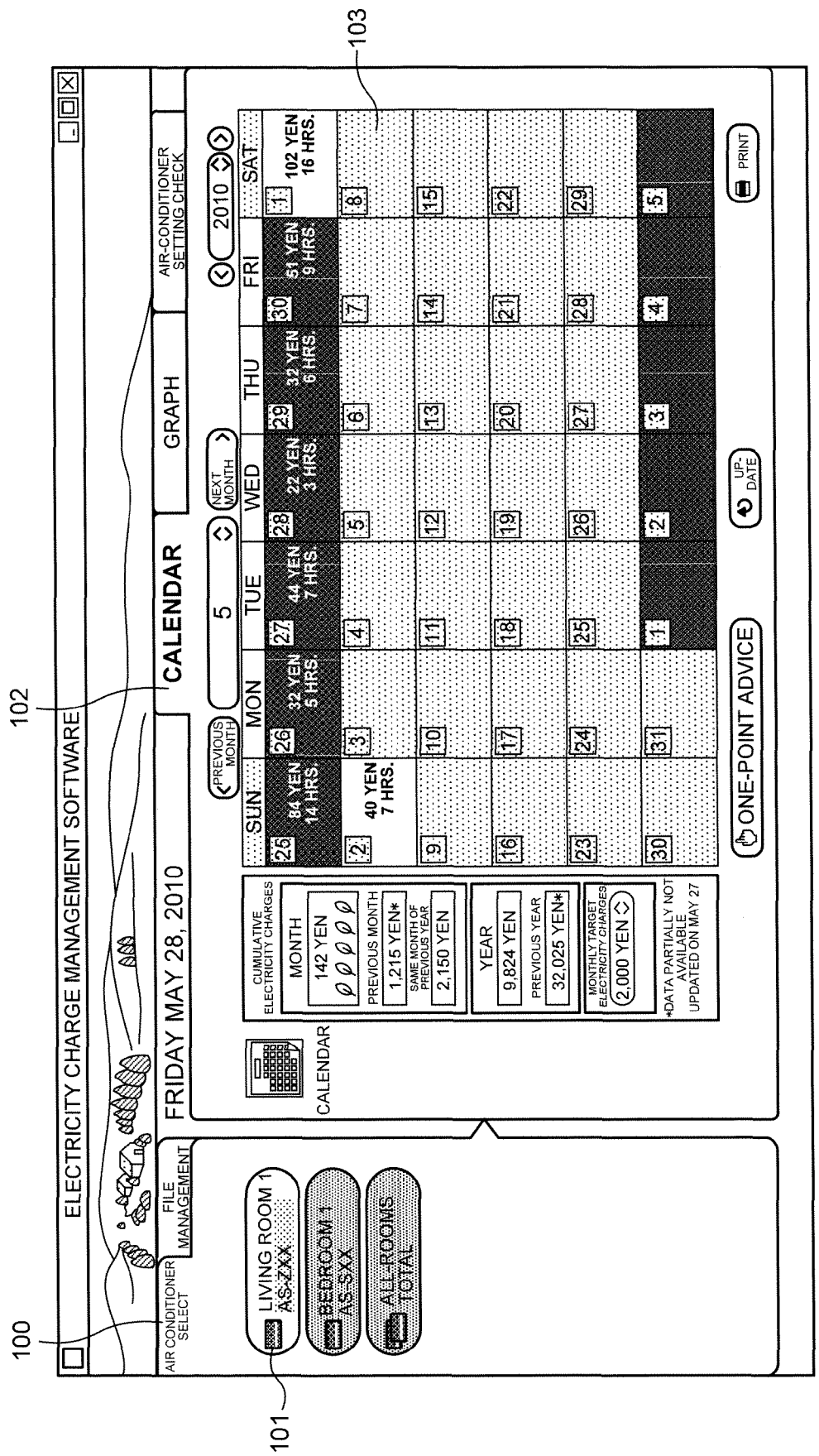
FIG. 13 is a diagram illustrating an example of a PC screen on which operating-information management of air conditioner is performed by the PC based on the log information acquired.

FIGS. 13 to 28 are diagrams illustrating examples of a PC screen on which the operating-information management of air conditioner is performed based on the log information acquired by the PC. The PC 3 first displays the screen as illustrated in FIG. 13 by the operating-information management software. When the operator clicks on an air-conditioner select tag 100, and then clicks on a button 101 of "Living room 1" therein and clicks on a calendar tag 102, displayed is a calendar screen 103 on which operating hours and electricity charges on a daily basis, monthly and yearly electricity charges, target electricity charges of the month, and others for the air conditioner in "Living room 1" are indicated. This allows the operator to continuously comprehend the operating status and electricity charges for each air conditioner, and that can be used for efficient use and setting of the air conditioner.

Figure 14:
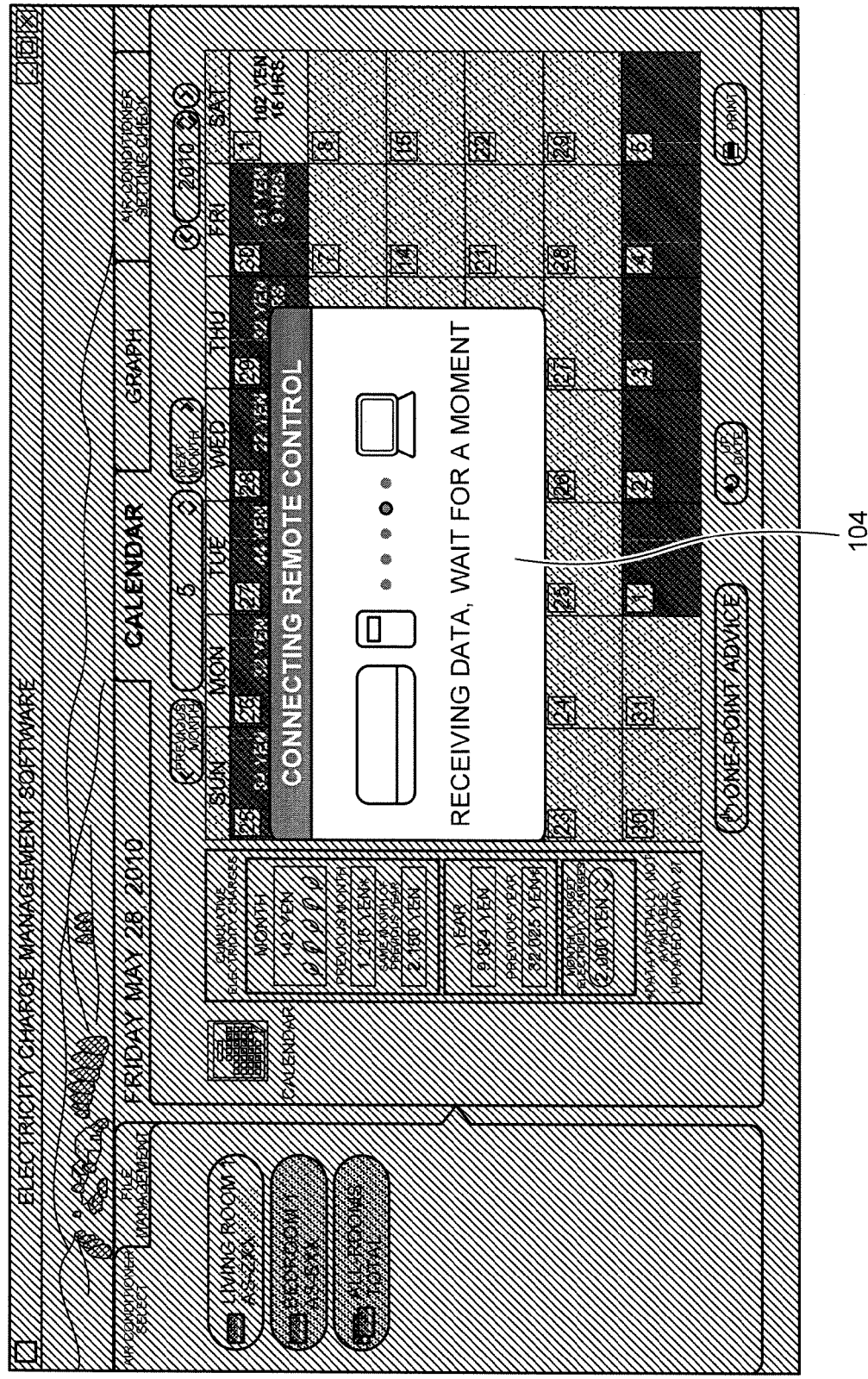
FIG. 14 is a diagram illustrating an example of the PC screen on which the operating-information management of air conditioner is performed by the PC based on the log information acquired.
Figure 15:
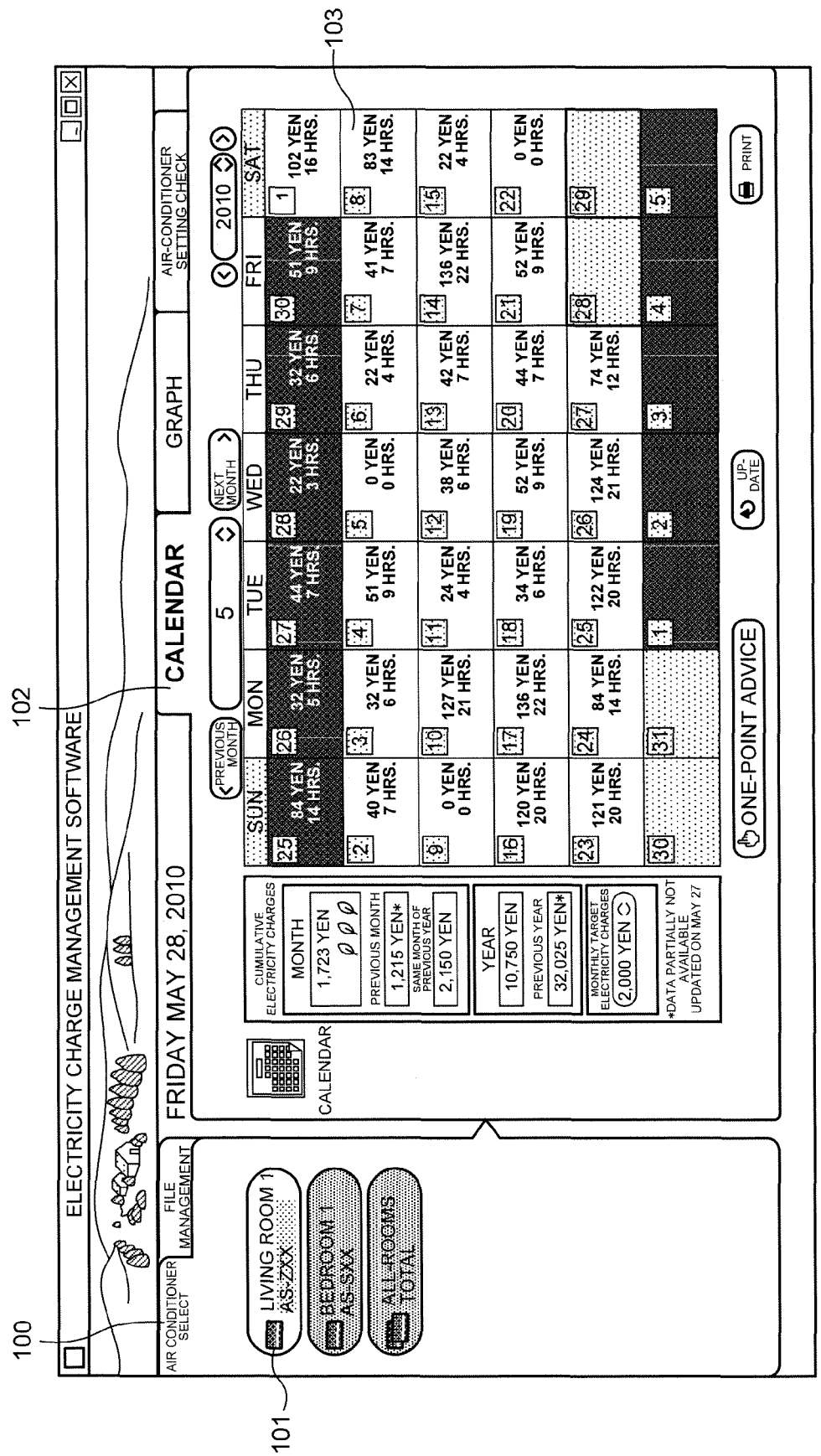
FIG. 15 is a diagram illustrating an example of the PC screen on which the operating-information management of air conditioner is performed by the PC based on the log information acquired.

When the PC 3 and the remote control 1 are connected in USB connection, displayed is a window 104, as illustrated in FIG. 14, indicating that the remote control 1 is connected and data is being received. When the new operating information is imported to the PC 3, displayed is a screen of the calendar screen 103, as illustrated in FIG. 15, on which the operating hours and electricity charges stored in the remote control 1 up to a previous day are added.

Figure 16:
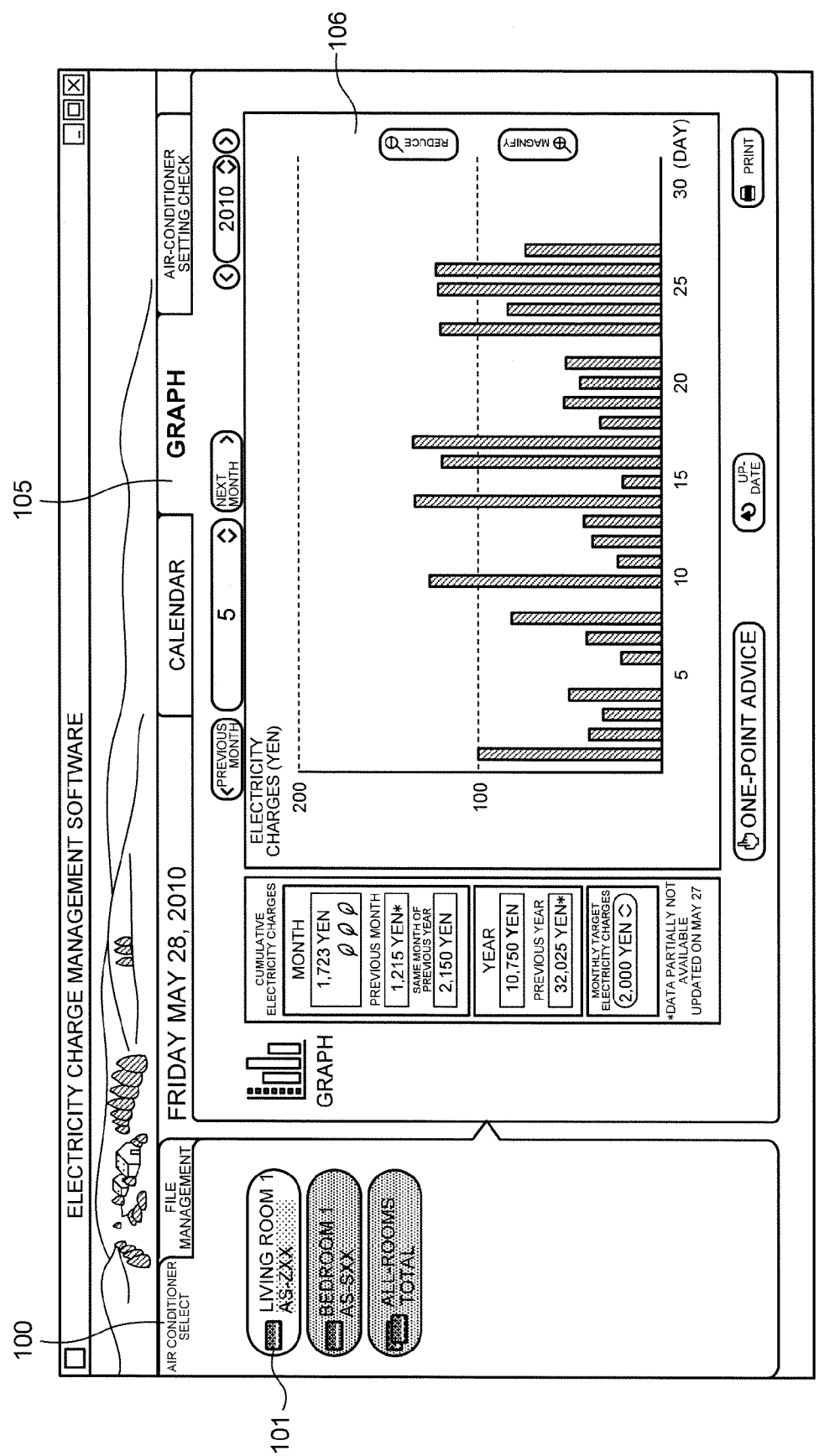
FIG. 16 is a diagram illustrating an example of the PC screen on which the operating-information management of air conditioner is performed by the PC based on the log information acquired.

When the operator subsequently clicks on a graph tag 105 on the screen under the condition in FIG. 15, displayed is a graphic screen 106, as illustrated in FIG. 16, on which the daily electricity charges are indicated in a bar graph. This allows the operator to comprehend at a glance an increase and decrease in electricity charges of the air conditioner for a month. Furthermore, as cumulative total electricity charges, displayed are the total electricity charges of the air conditioner for "Living room 1" for the current month, the total electricity charges for the previous month, the yearly total of electricity charges, the total electricity charges for the previous year, target electricity charges for the month, and others, allowing the operator to comprehend the operating status of the air conditioner from various perspectives.

Figure 20:
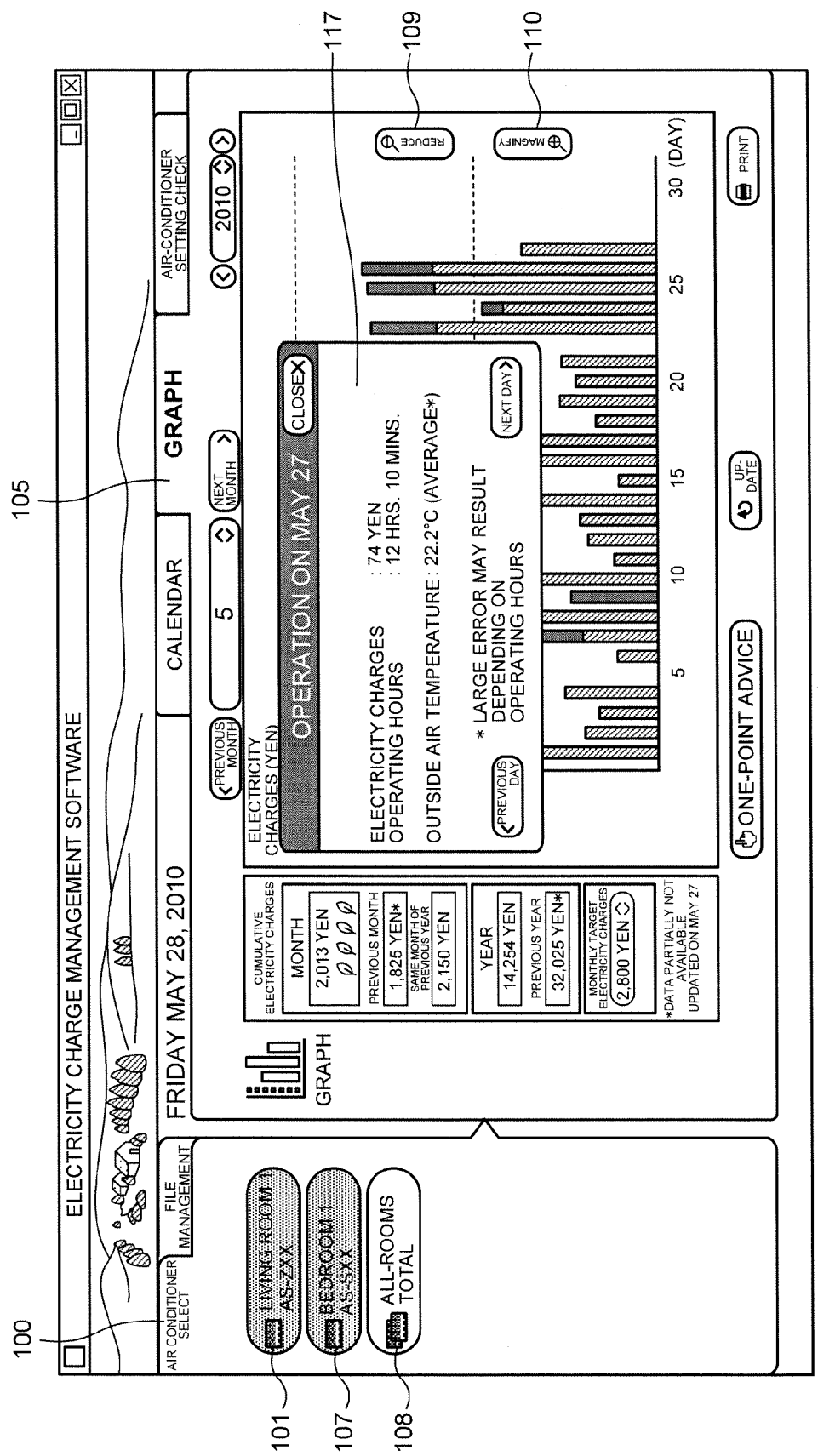
FIG. 20 is a diagram illustrating an example of the PC screen on which the operating-information management of air conditioner is performed by the PC based on the log information acquired.

In the screen in FIG. 20, when an all-rooms total button 108 in the air-conditioner select tag 100 is clicked, displayed is the graphic screen 106 on which the respective electricity charges for the "living room 1" button 101 and a "bed room 1" button 107 in different colors (different densities in case of monochromatic display) are summed. This allows the operator to comprehend at a glance the total electricity charges for all rooms and the breakdown thereof. In the graphic screen 106, a reduce button 109 and a magnify button 110 are further provided. For example, when the operator clicks on the magnify button 110 under the condition illustrated in FIG. 17, the graphic screen 106 changes the rate of the graph as illustrated in FIG. 18 and is displayed in an enlarged manner. This allows the operator to clearly comprehend subtle changes in electricity charges.

Figure 19:
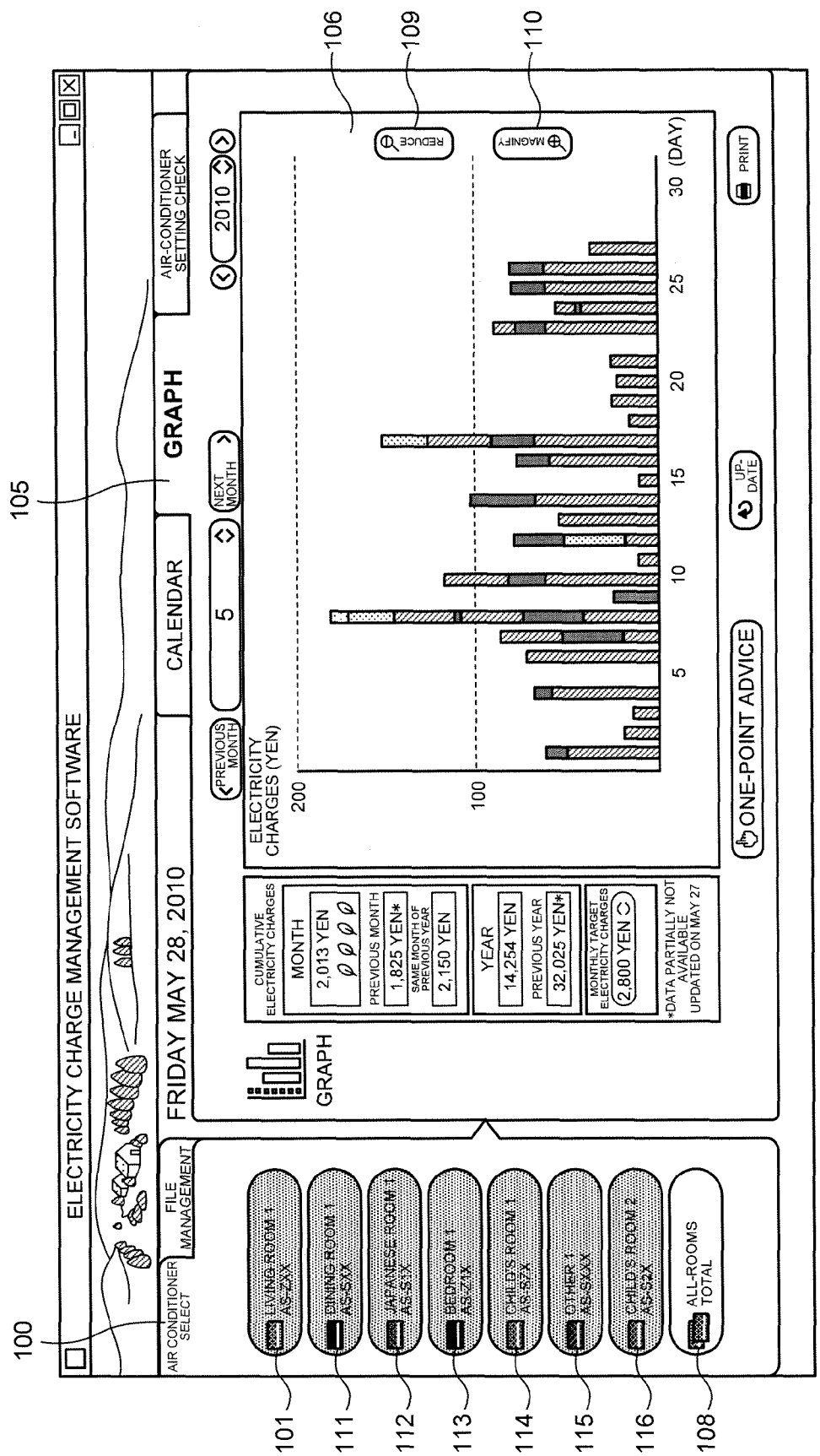
FIG. 19 is a diagram illustrating an example of the PC screen on which the operating-information management of air conditioner is performed by the PC based on the log information acquired.

For example, as illustrated in FIG. 19, when a number of air conditioners are registered in the air-conditioner select tag 100 as the "living room 1" button 101, a "dining room 1" button 111, a "Japanese room 1" button 112, a "bed room 1" button 113, a "child's room 1" button 114, "another 1" button 115, and a "child's room 2" button 116, clicking on the all-rooms total button 108 displays the graph of daily totals of electricity charges for all rooms. The graph of daily totals of electricity charges for all rooms is further indicated in different colors (different densities in case of monochromatic display) for the respective rooms, and thus allows the operator to comprehend at a glance the breakdown of the respective electricity charges of the air conditioners.

Figure 17:
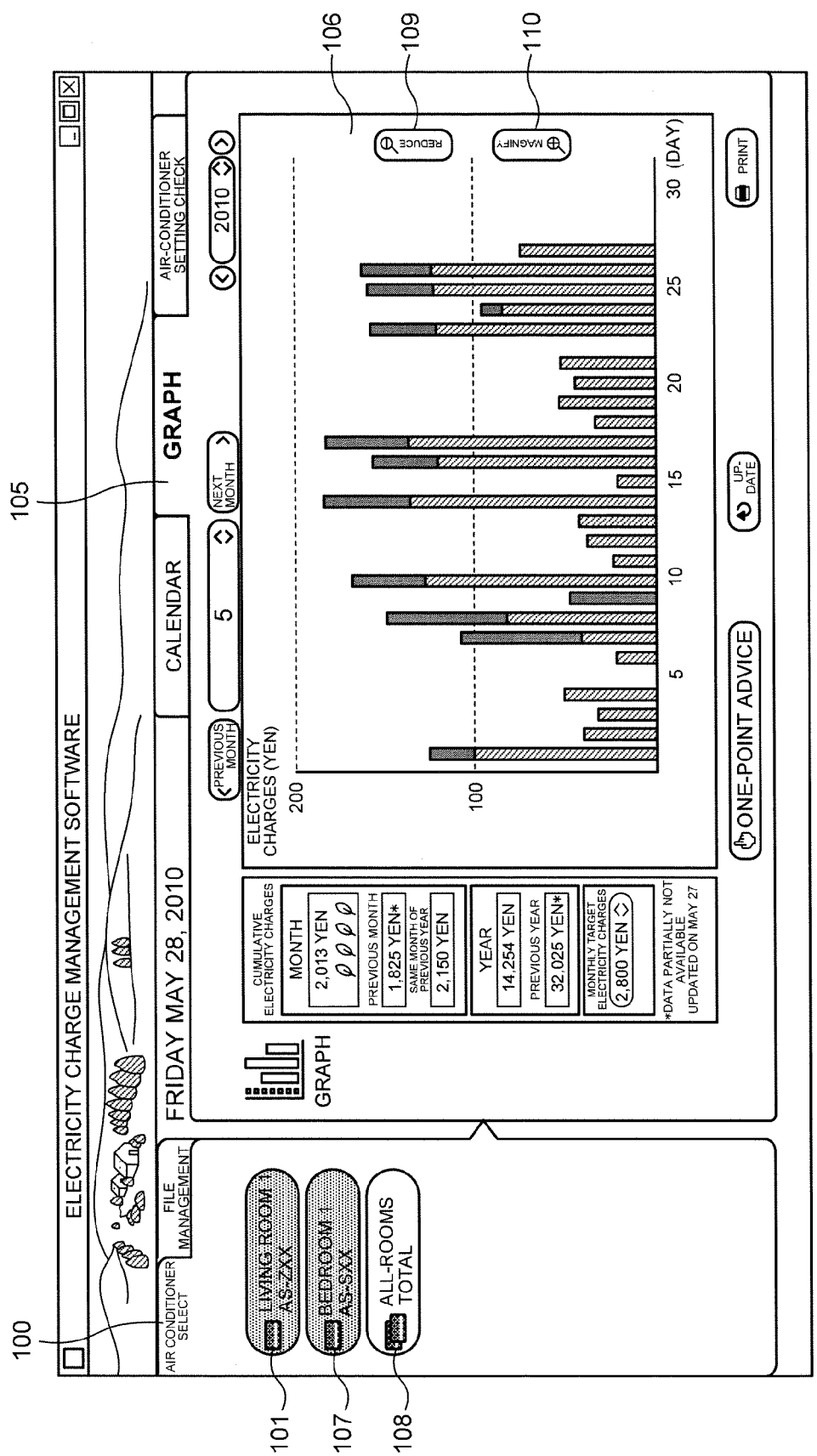
FIG. 17 is a diagram illustrating an example of the PC screen on which the operating-information management of air conditioner is performed by the PC based on the log information acquired.
Figure 18:
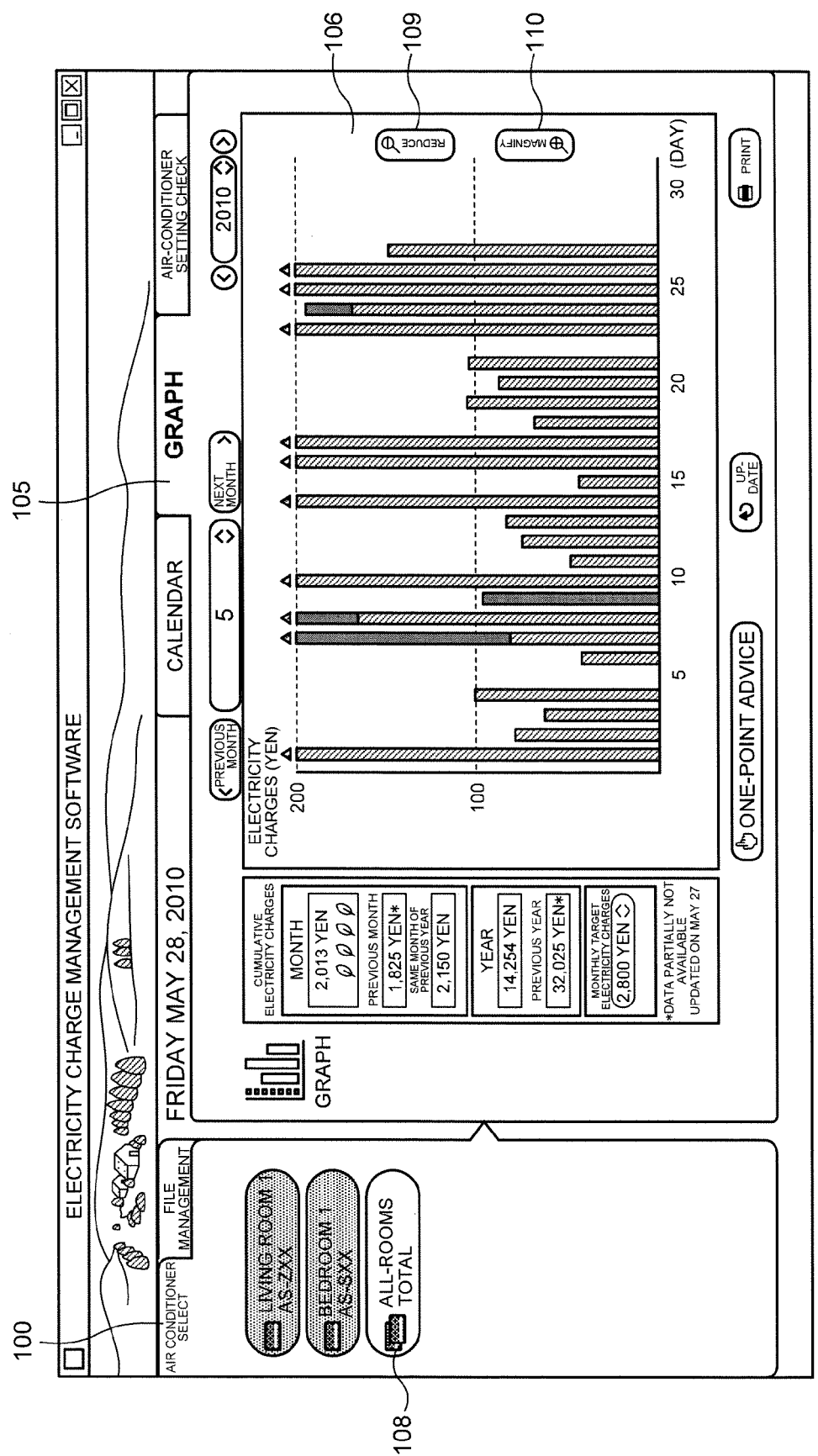
FIG. 18 is a diagram illustrating an example of the PC screen on which the operating-information management of air conditioner is performed by the PC based on the log information acquired.

Furthermore, in the graphic display illustrated in FIG. 17, clicking on a specific day opens a window 117, as illustrated in FIG. 20, indicating the operating status for the day in detail. In the window, a total of electricity charges for all rooms, operating hours, and an average temperature of outside air temperature for the day, for example, can be displayed.

Figure 21:
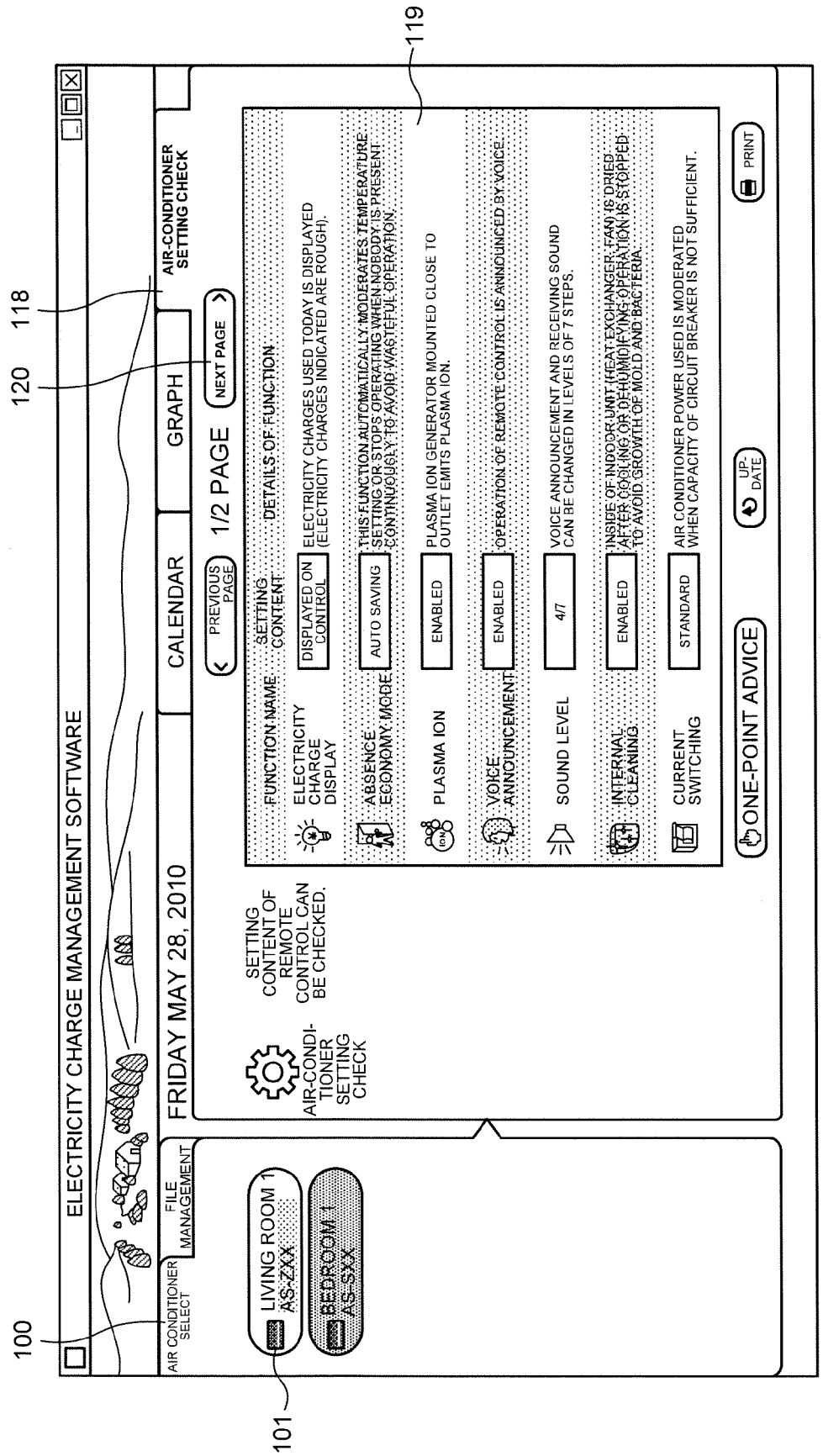
FIG. 21 is a diagram illustrating an example of the PC screen on which the operating-information management of air conditioner is performed by the PC based on the log information acquired.
Figure 22:
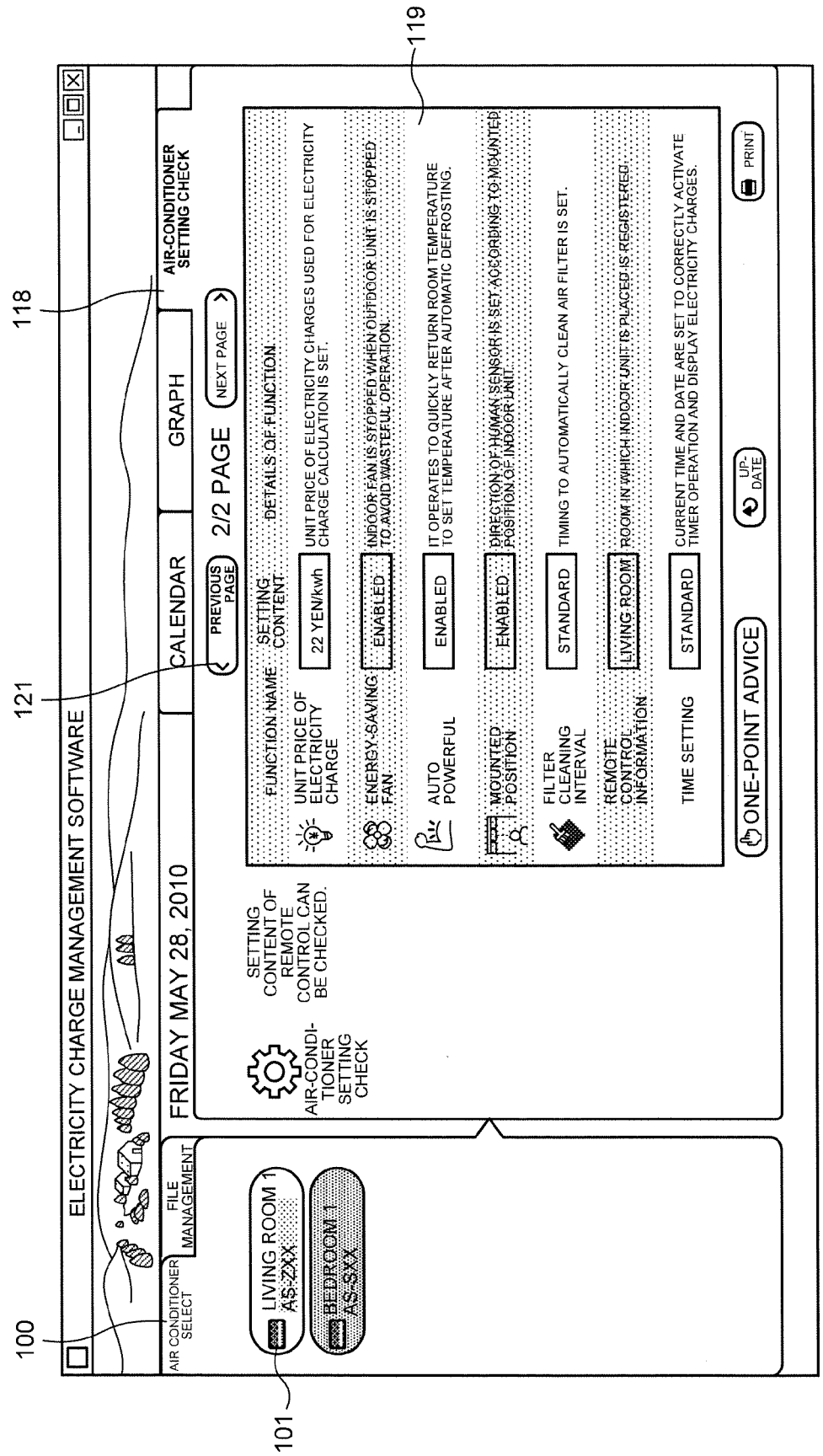
FIG. 22 is a diagram illustrating an example of the PC screen on which the operating-information management of air conditioner is performed by the PC based on the log information acquired.

Furthermore, an air-conditioner setting-check screen 119 illustrated in FIG. 21 is the screen displayed when the "living room 1" button 101 in the air-conditioner select tag 100 is clicked and then an air-conditioner setting-check tag 118 is clicked. In the air-conditioner setting-check screen 119, the detail of setting content for the air conditioner registered to the "living room 1" button 101 can be easily checked on the screen of the PC 3. In the air-conditioner setting-check screen 119, the functions of setting content are further displayed. Consequently, when the operator changes the setting content, the operator can do so while correctly understanding the setting content. Moreover, when a next page button 120 is clicked, as illustrated in FIG. 22, the next page of the air-conditioner setting-check screen 119 is displayed. When changing the setting content, by clicking on the setting content to change, the setting content is displayed in a menu form, and then by clicking on a desired content, the setting content is changed. When returning to the air-conditioner setting-check screen 119 on the previous page, a previous page button 121 is clicked. The setting information thus changed is transmitted from the PC 3 to the remote control 1 connected in USB connection, and when the remote control 1 transmits a command or the like to the air-conditioner indoor unit 2, the changed setting information is transmitted together, whereby the setting of the air-conditioner indoor unit 2 is changed.

Figure 23:
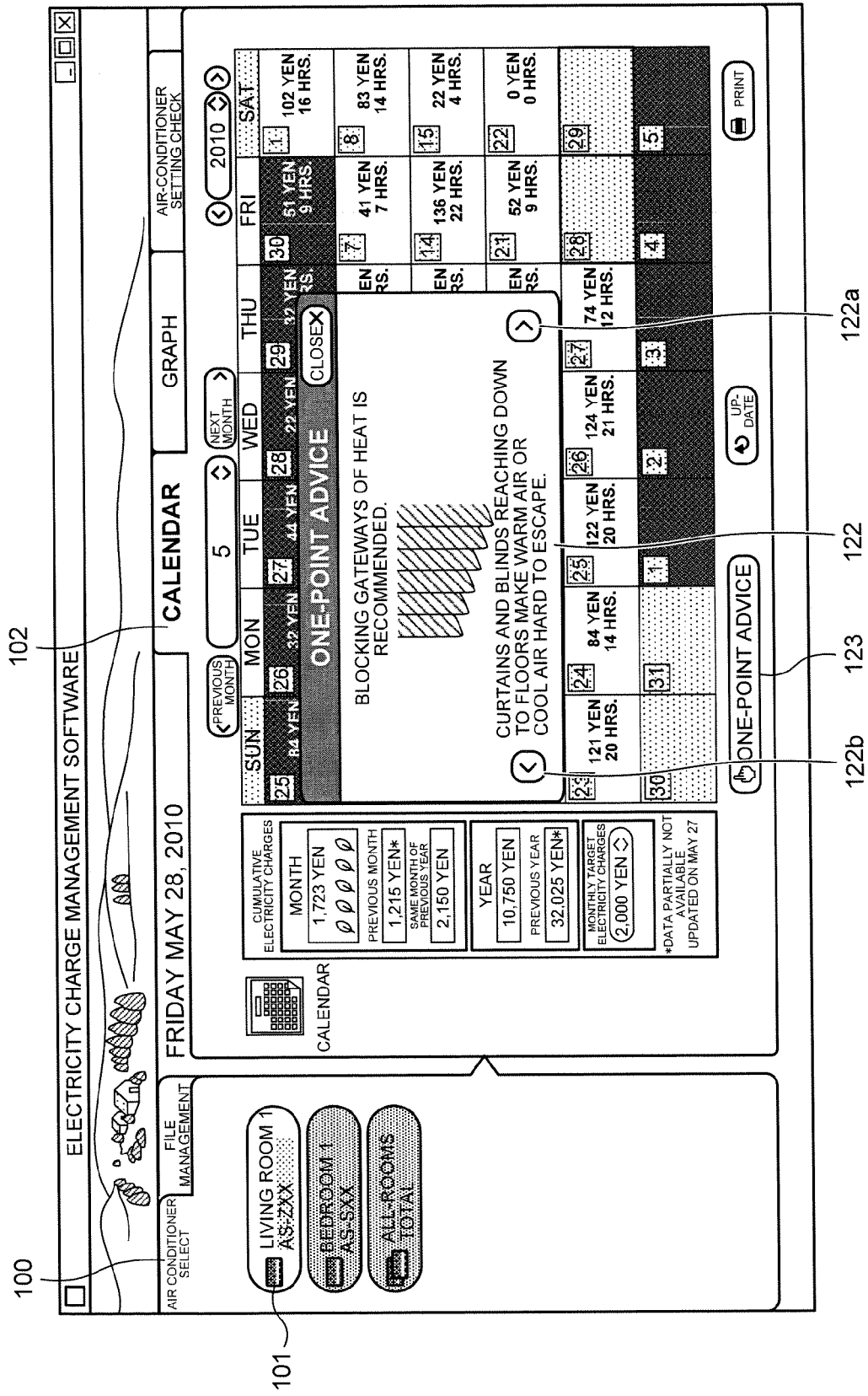
FIG. 23 is a diagram illustrating an example of the PC screen on which the operating-information management of air conditioner is performed by the PC based on the log information acquired.
Figure 24:
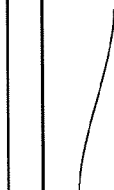
FIG. 24 is a diagram illustrating an example of the PC screen on which the operating-information management of air conditioner is performed by the PC based on the log information acquired.

In the calendar display in FIG. 15, by clicking on a one-point advice button 123 indicated in FIG. 23, a one-point advice window 122 displaying advice to the operator for an efficient use of the air conditioner is opened up. When there are a plurality of one-point advice windows 122, by clicking on a next page button 122a or a previous page button 122b, another one-point advice window 122 is opened up (see FIG. 24).

Figure 25:
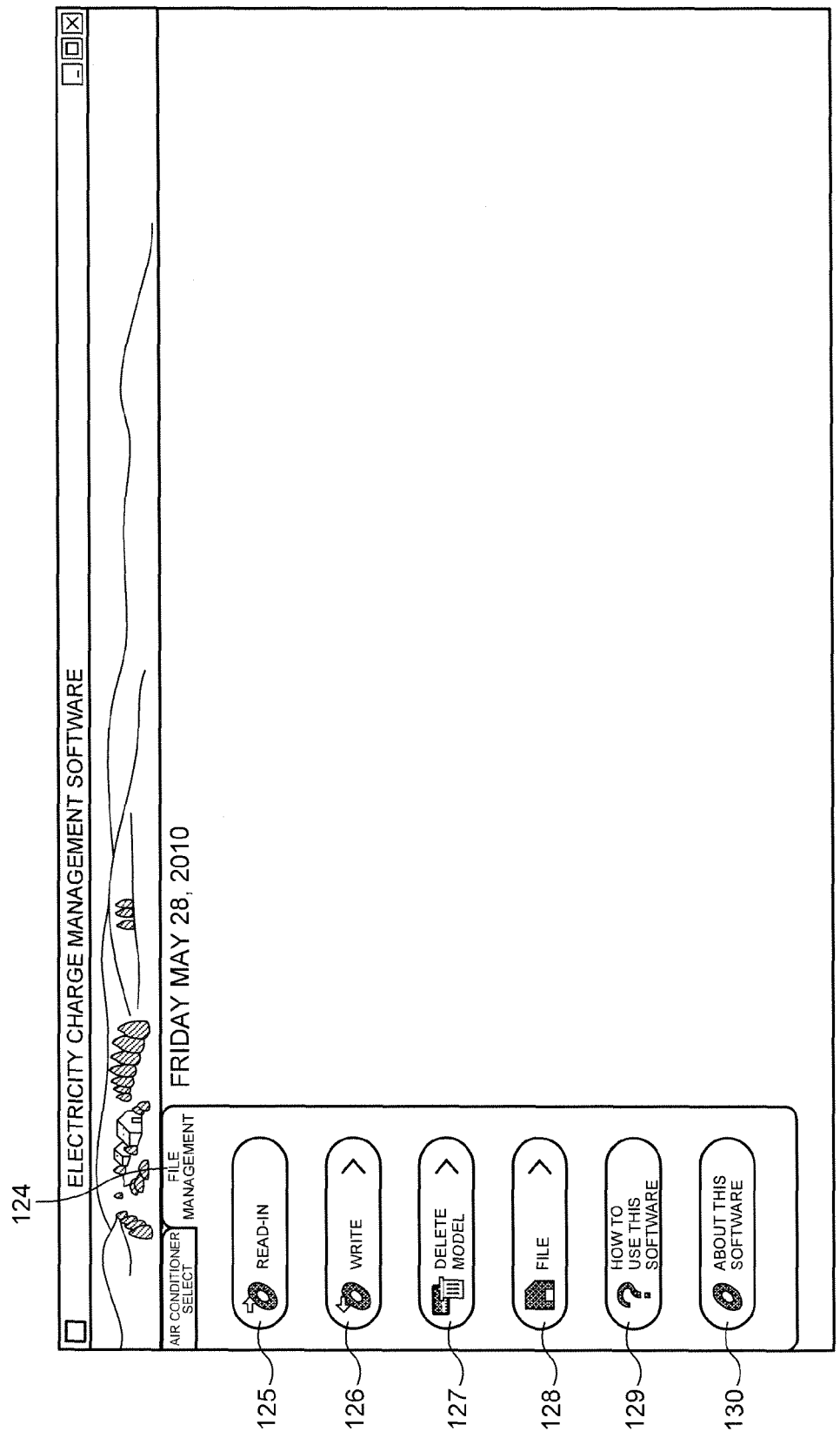
FIG. 25 is a diagram illustrating an example of the PC screen on which the operating-information management of air conditioner is performed by the PC based on the log information acquired.
Figure 26:
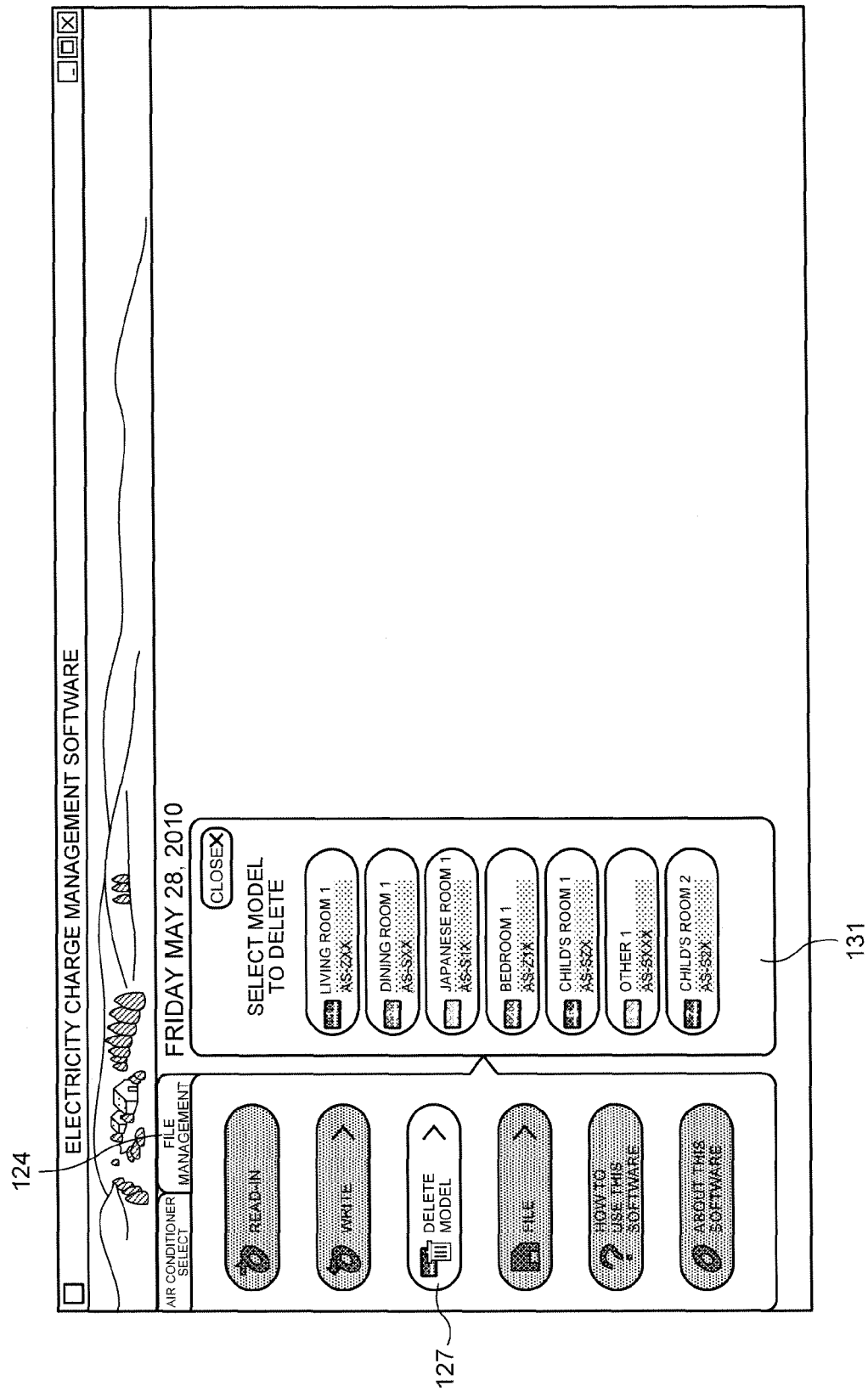
FIG. 26 is a diagram illustrating an example of the PC screen on which the operating-information management of air conditioner is performed by the PC based on the log information acquired.
Figure 27:
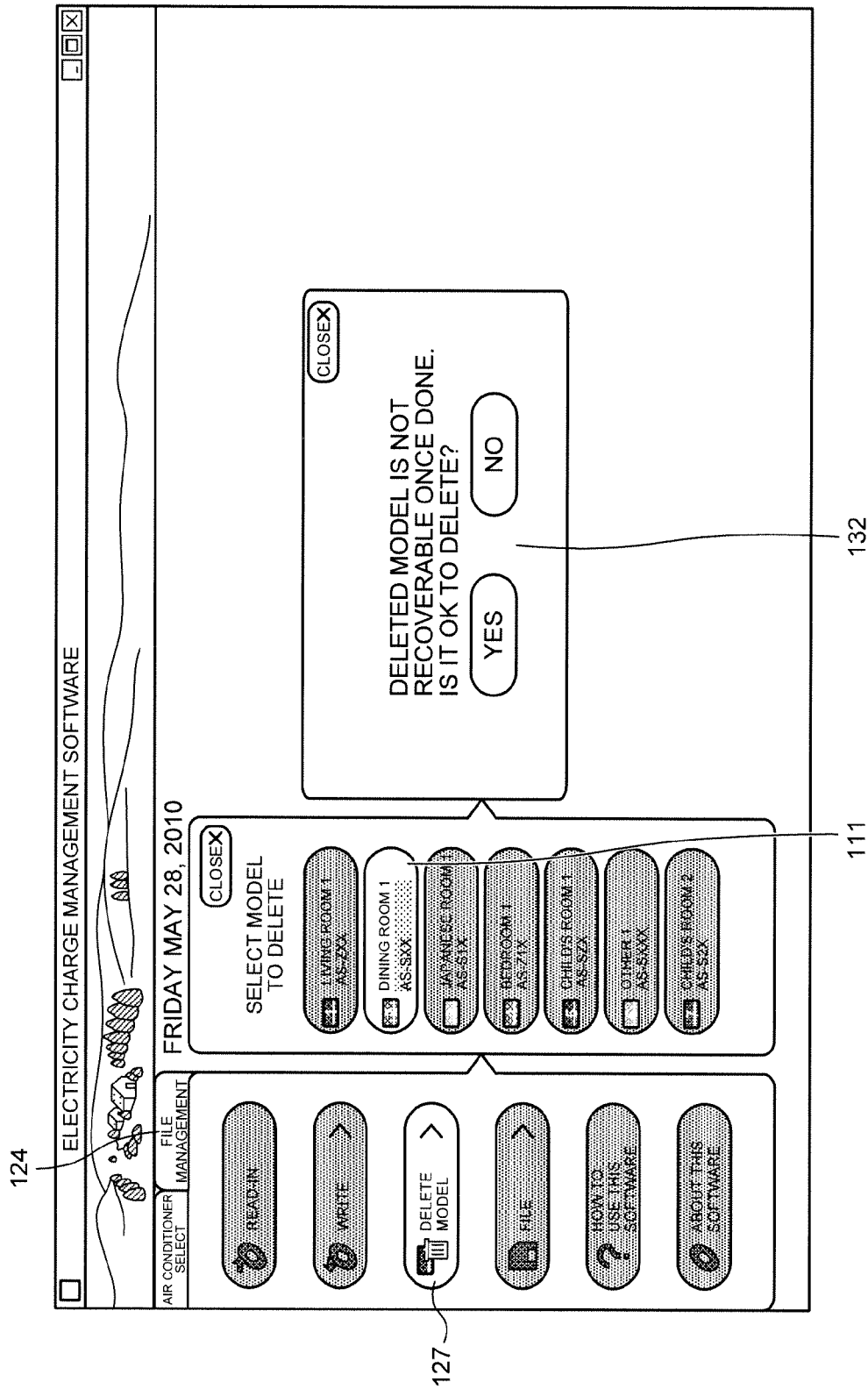
FIG. 27 is a diagram illustrating an example of the PC screen on which the operating-information management of air conditioner is performed by the PC based on the log information acquired.

Furthermore, as illustrated in FIG. 25, clicking on a file management tag 124 next to the air-conditioner select tag 100 displays a read-in button 125 to read in data from a CD-ROM and such, a write button 126 to write data to a CD-R or the like, a delete-model button 127 to delete the models of air conditioners registered in the air-conditioner select tag, a file button 128 to write files to a flexible disk (FD) or the like, a "how to use this software" button 129 to display help of this PC software, and an "about this software" button 130 to display the name, provider, version information, and others of the PC software. Clicking on the delete model button 127 in the foregoing, for example, opens up a window 131, as illustrated in FIG. 26, indicating a list of models already registered. For example, clicking on a "dining room 1" button 111 in the list opens up a confirmation window 132 to confirm the deletion as illustrated in FIG. 27, and clicking on "Yes" deletes the model or clicking on "No" aborts the deletion.

Figure 28:
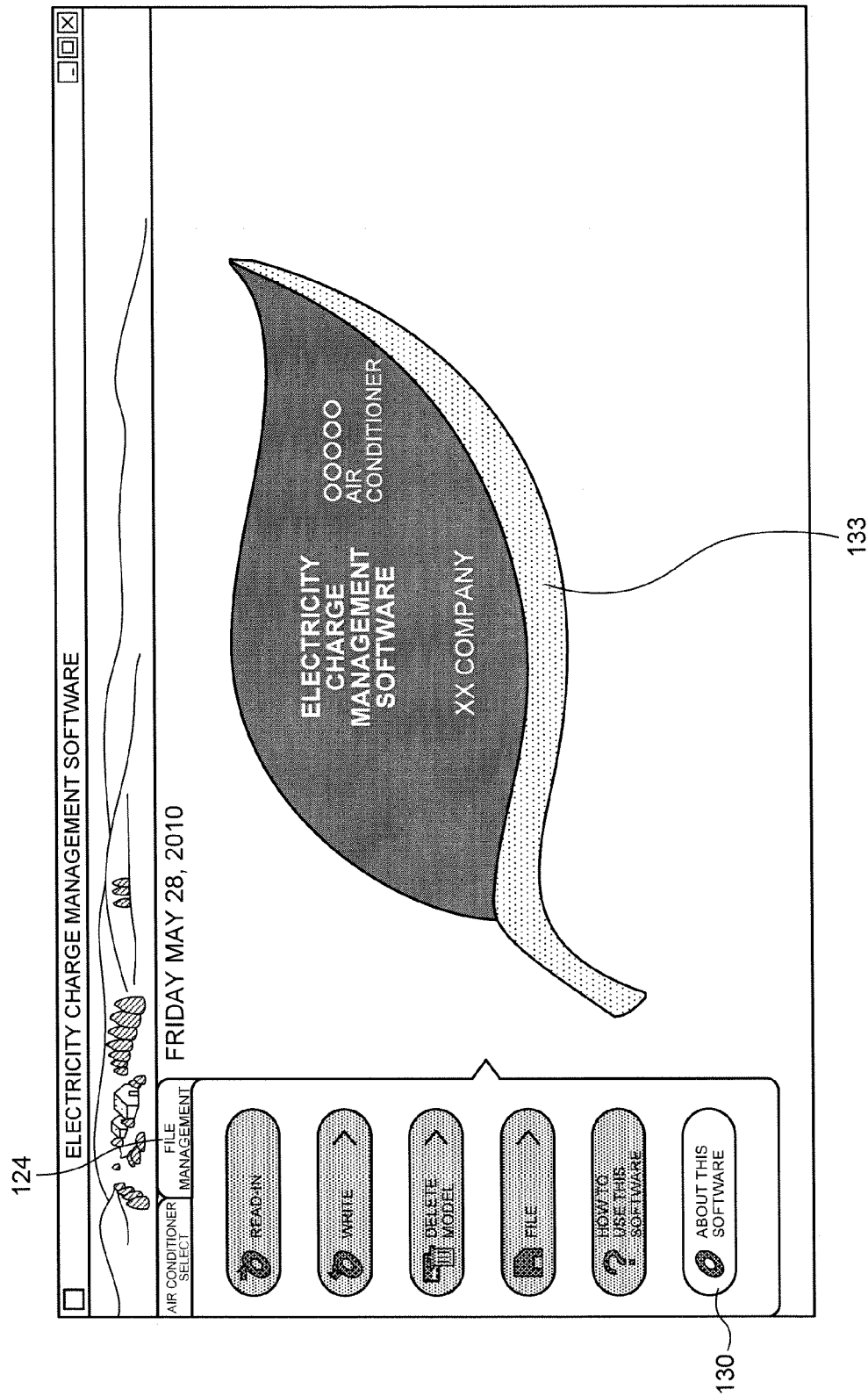
FIG. 28 is a diagram illustrating an example of the PC screen on which the operating-information management of air conditioner is performed by the PC based on the log information acquired.

As illustrated in FIG. 28, clicking on the about this software button 130 in the file management tag 124 displays a screen 133 on which the name of the PC software, name of the provider, release date (year, month, day) thereof though not depicted, and others are indicated.

As in the foregoing, the air conditioner according to the embodiment makes the remote control 1 display the operating status of the air-conditioner indoor unit 2 and the result of communication, that is, whether the communication was successful. Therefore, the air conditioner according to the embodiment has an advantage in that just looking at the indication displayed on the remote control 1 can make the operator easily understand which operating status the air-conditioner indoor unit 2 is currently in.

Furthermore, the air conditioner in the embodiment can make the operator reliably understand whether the communication is successful when the remote control is operated in a room in which the air-conditioner indoor unit 2 is not placed. Moreover, even when the operator operates the remote control 1 unintentionally, as the remote control 1 displays what the control state is, the operator can respond to that by looking at the display. The use of the memory type liquid crystal display for continuously displaying such information can provide less power consumption.

In the air conditioner according to the embodiment, when the remote control 1 fails to establish the communication with the air-conditioner indoor unit 2, the display is continued using the information previously displayed up to that time, without displaying the indication that no data is acquired, and at the time the communication is successful, the data is rewritten. Consequently, the latest data acquirable can be displayed at all times without being affected by a communication error.

INDUSTRIAL APPLICABILITY

As in the foregoing, the air conditioner according to the present invention is useful when bidirectional communication using a radio wave is available between the air-conditioner main body and the remote control, and in particular, it is suitable for the air conditioner that is capable of making the remote control continuously display the control state with the air-conditioner main body and the operating status thereof.

The invention claimed is:

1. An air conditioner comprising:
an air-conditioner main body; and
a remote controller configured to perform bidirectional communication using radio waves and to control operation of the air-conditioner main body, wherein
the air-conditioner main body includes:
   a main-body receiver that receives a control signal to control operation from the remote controller, and
   a main-body transmitter that transmits operating information of the air-conditioner main body to the remote controller, and
the remote controller includes:
   a remote-control transmitter that transmits the control signal of operation control to the air-conditioner main body,
   a remote-control receiver that receives the operating information transmitted from the air-conditioner main body,
   a display unit that displays control content of the operation control or the operating information,
   a display controller that controls display content of the display unit, and
   a reception-time limiting unit that sets the remote-control receiver in a reception standby state when the remote-control transmitter transmits the control signal and that cancels the reception standby state in a predetermined length of time, and
the display controller displays the operating information on the display unit when the display controller has received the operating information from the main-body transmitter, and displays an error indication of communication being not available on the display unit when the display controller has failed to receive the operating information, when communication between the remote controller and the air-conditioner main body is not established during the reception standby state.

2. The air conditioner according to claim 1, wherein the remote controller includes, in place of the reception-time limiting unit, a power-saving standby unit that sets the remote-control receiver in a reception standby state when a request signal that requests operating information is transmitted from the remote controller to the air-conditioner main body at a predetermined time interval, and that cancels the reception standby state in a predetermined length of time.

3. The air conditioner according to claim 1, wherein the display controller displays on the display unit, in place of the error indication, an indication of communication being successful when communication between the remote controller and the air-conditioner main body is successful during the reception standby state.

4. The air conditioner according to claim 1, wherein the display controller continues the display even when the remote controller is in the reception standby state.

5. The air conditioner according to claim 2, wherein the display controller displays operating information at a point of time of transmitting the request signal when the operating information is not acquired.

6. The air conditioner according to claim 2, wherein the display controller displays control content at a point of time of transmitting the request signal when the operating information is not acquired.

* * * * *